United States Patent [19]
Takano et al.

[11] Patent Number: 5,297,132
[45] Date of Patent: Mar. 22, 1994

[54] DRAW TYPE OPTICAL RECORDING MEDIUM

[75] Inventors: Atsushi Takano, Kokubunji; Masayuki Iijima, Koto; Kazuo Umeda, Setagaya; Kazuo Takahashi, Koto; Osamu Sasaki, Shinjuku; Hitoshi Fujii, Kasukabe; Mitsuru Takeda, Yokohama; Masaaki Asano, Shinjuku, all of Japan

[73] Assignee: Dai Nippon Insatsu Kabushiki Kaisha, Japan

[21] Appl. No.: 892,471

[22] PCT Filed: Sep. 25, 1987

[86] PCT No.: PCT/JP87/00702

§ 371 Date: Jun. 24, 1988

§ 102(e) Date: Jun. 24, 1988

[87] PCT Pub. No.: WO88/03310

PCT Pub. Date: May 5, 1988

Related U.S. Application Data

[63] Continuation of Ser. No. 219,158, Jun. 24, 1988, abandoned.

[30] Foreign Application Priority Data

| Oct. 29, 1986 | [JP] | Japan | 61-257789 |
| Nov. 28, 1986 | [JP] | Japan | 61-283398 |
| Nov. 29, 1986 | [JP] | Japan | 61-285773 |
| Dec. 9, 1986 | [JP] | Japan | 61-292975 |
| Mar. 27, 1987 | [JP] | Japan | 62-73469 |

[51] Int. Cl.$^5$ ............................................. G11B 7/24
[52] U.S. Cl. ............................ 369/284; 369/286; 369/288; 369/275.100
[58] Field of Search ........... 369/280, 282, 283, 284, 369/286, 288, 13, 275.1, 275.2, 275.3; 428/694, 900

[56] References Cited

U.S. PATENT DOCUMENTS

| 4,461,807 | 7/1984 | Mori et al. | 346/135.1 X |
| 4,531,183 | 7/1985 | Moritomo et al. | 436/76 L X |
| 4,544,443 | 11/1985 | Ohta et al. | 369/13 X |
| 4,717,628 | 1/1988 | Takahaski et al. | 428/900 X |
| 4,737,415 | 4/1988 | Ichijo et al. | 428/447 |
| 4,778,747 | 10/1988 | Ohta et al. | 369/279 X |

FOREIGN PATENT DOCUMENTS

| 0111988 | 6/1984 | European Pat. Off. | 369/13 |
| 57-186242 | 11/1982 | Japan | 369/284 |
| 61-255848 | 8/1986 | Japan | 369/283 |
| 61-210544 | 9/1986 | Japan | 369/284 |
| 62-203159 | 6/1987 | Japan | 369/284 |
| 1-112358 | 3/1989 | Japan | 369/283 |
| 1-152111 | 5/1989 | Japan | 369/283 |
| 1-230539 | 6/1989 | Japan | 369/283 |
| 1-361261 | 10/1989 | Japan | 369/283 |
| 2097142 | 10/1982 | United Kingdom | 369/284 |

*Primary Examiner*—Stuart S. Levy
*Assistant Examiner*—Paul J. Ditmyer
*Attorney, Agent, or Firm*—Parkhurst, Wendel & Rossi

[57] ABSTRACT

The DRAW type optical recording medium which can record optical information by forming information pits in the recording layer by irradiation of an energy beam such as laser beam, and yet can reproduce the information immediately after writing without requiring any step of developing processing after writing of information. The optical recording medium includes a recording layer (3) for forming information pits through the occurrence of physical deformation by irradiation of an energy beam and a sensitizing layer (4) for augmenting the physical deformation in the recording layer (3) laminated on a support (2). By the presence of the sensitizing layer, recording sensitivity is improved and also stability of the medium with lapse of time becomes excellent. Further, due to the presence of the sensitizing layer, the optical recording medium can be a sealed structure and therefore the optical recording medium is lightweight and flexible, and can be made in various forms such as card, sheet, a flexible sheet, and the like.

6 Claims, 7 Drawing Sheets

DRAW TYPE OPTICAL RECORDING MEDIUM

This is a continuation of application Ser. No. 07/219,158 filed Jun. 24, 1988, now abandoned.

TECHNICAL FIELD

This invention relates to an optical recording medium which can record optical information by forming pits on a recording layer by irradiation of an energy beam such as a laser beam and, more particularly, the present invention relates to the so-called DRAW (direction-read-after-write) type which can "directly read after writing" without requiring the step of developing processing, etc. after writing of information.

BACKGROUND ART

In the prior art, as a high density optical recording medium, there have been known two methods, namely the method in which a metal, a semi-metal or an organic compound is melted or evaporated by a highly converged recording light such as a laser beam to form a concave portion or a pit portion, and the method in which discrimination pits are formed by a transfer between two thermodynamically semi-stable states such as crystalline and non-crystalline states.

These optical recording methods provide optical recording materials and tracking patterns for following an optical beam on generally rigid glass discs or plastic discs, and the medium recorded according to this method has been generally known as a medium shaped in optical recording disc. Such medium shaped in optical recording disc, while having the advantages of high dimensional precision and high mechanical strength, has on the other hand problems that the driving device becomes greater in scale, and also the medium as well as the device are expensive for the reasons such that the weight and the thickness become greater. Accordingly, such medium has not yet been generally prevailed widely. For an optical recording medium capable of high density recording to be generally prevailed widely, in addition to the medium shaped in optical recording disc of the prior art, advent of an optical recording medium which is lightweight, compact and yet inexpensive such as a medium shaped in optical record flexible disc, a medium shaped in optical recording card, a medium shaped in optical recording tape, a medium shaped in optical recording sheet has been awaited.

Of the two high density optical recording methods as described above, the first method must form a concave portion or a pit portion during recording. For this purpose, the substance must be taken away by melting or evaporation, whereby the mass transfer during recording becomes unavoidably great. Therefore, for making the recording sensitivity sufficiently large, it has been frequently practiced to make substance transfer readily occur by having the recording portion of the optical recording material exposed to the air. However, in this case, the optical recording material may be oxidized by the influence of the moisture in the air to cause deterioration, or foreign matter may be collided against the optical recording material, whereby there is a danger that an accident may occur such that the optical recording material may be mechanically destroyed. For this reason, there is employed a structure in which the optical recording material is sealed with a gap interposed therebetween. However, in a medium structure having such vacant space, both weight and thickness are increased, whereby it is difficult to give a diversity of shapes such as flexible disc, card, tape, sheet, etc.

On the other hand, the second method, namely the method in which transfer between the thermodynamically semi-stable states is utilized, due to small substance transfer during recording, the optical recording material is not required to be exposed to the air, but sealing is possible without provision of a gap. Therefore, according to the recording method by such transfer, it can correspond to a diversity of shapes of medium. In the prior art, as the material to be used for such transfer, crystalline—non-crystalline phase transfer materials such as $TeO_x$, As-Te-Ge have been known. However, the phase transfer materials of the prior art tend to be remarkably unstabilized with lapse of time, and also the optical characteristic change amount between crystal and non-crystal is smaller as compared with the above pit portion formation, whereby it is not necessarily satisfactory with respect to precision of recording and reproduction.

DISCLOSURE OF THE INVENTION

The present invention has been accomplished in view of the problems accompanied with the prior art, and aims at the following points.

(a) To provide an optical recording medium having stable recording characteristics with lapse of time.

(b) To provide an optical recording medium which can effect recording and reproduction of high sensitivity and can be made to have a structure of essentially sealed type without requiring the optical recording material layer to be exposed to the external air or to provide a gap in the material layer.

(c) To provide an optical recording medium of light weight and low cost which can be applied for medium of various forms such as flexible disc, card, tape, sheet, etc.

In order to accomplish the objects as mentioned above, the DRAW type optical recording medium according to the present invention comprises (a) a recording medium for forming information pits through occurrence of physical deformation by irradiation of an energy beam and (b) a sensitizing layer for augmenting thermochemically the physical deformation in said recording layer provided on a support.

Thus, in the present invention, since a sensitizing layer is formed by lamination on the recording layer, the recording sensitivity of information pits onto the recording layer is remarkably improved by the sensitizing layer. Further, by the sensitizing layer, the substance transfer during formation of pits onto the recording layer can be rapidly absorbed, and therefore it is not necessary to provide a space for substance transfer in the medium as in the prior art, whereby the medium structure can be made the essentially sealed type structure.

BEST MODES FOR PRACTICING THE INVENTION

Figure 1:
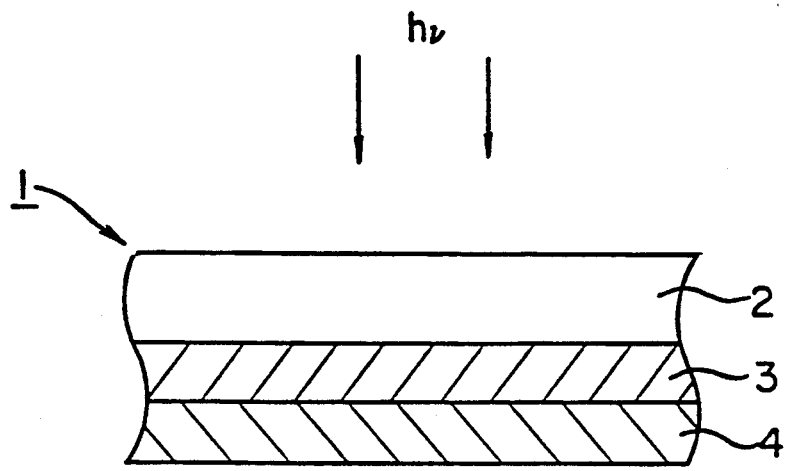
FIG. 1 through FIG. 8 are each a sectional view of the DRAW type optical recording medium according to the present invention.

As shown in the sectional view in FIG. 1, the optical recording material 1 according to one embodiment of the present invention has a structure comprising a recording layer 3 and a sensitizing layer 4 laminated in this order on the surface (the lower side in this Figure) of the support 2. In such embodiment, as shown in the Figure, recording and reading of information are effected from the side of the support (light-transmissive) 2. Accordingly, although not shown, the sensitizing layer and the recording layer 3 may be also laminated in this order on the support 2, and in this case, recording and reading of information are effected from the recording layer side.

Further, in the optical recording material of the present invention, a protective layer (not shown) comprising a synthetic resin, etc. may be also formed on the surface of the sensitizing layer 4 which becomes the outermost layer.

Figure 2:
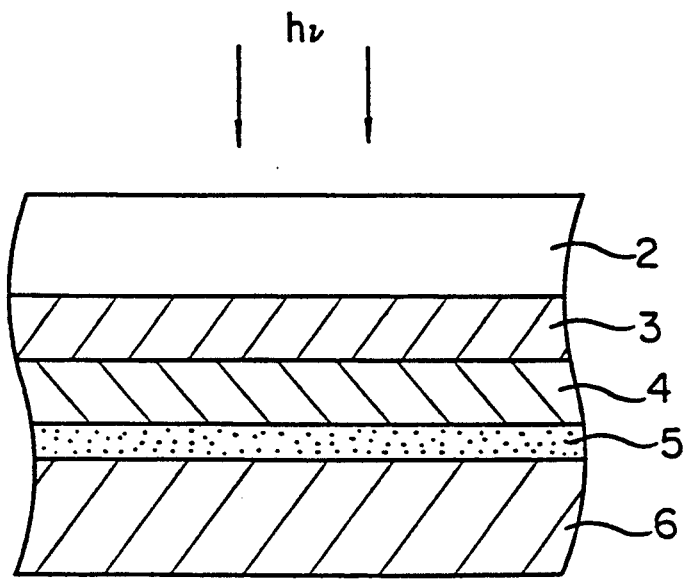

Also, in the optical recording material of the present invention, as the embodiment shown in FIG. 2, another substrate 6 can be further laminated and integrated through an adhesive layer 5 on the surface of the sensitizing layer 4.

In the following, the respective constituent elements are to be described.

SUPPORT

The support 2 is provided for supporting an optical recording material, and can be constituted of all the materials known in the art. Further, the support 2 may have another recording means formed thereon, if desired.

For the support 2, the material can be selected by determining the strength and the extent of flexibility in conformity with the use. For example, as the plastic, polycarbonate, polyester terephthalate, polyester resin, epoxy resin, acrylic resin, polyvinyl chloride resin, or polystyrene resin can be used, but otherwise ceramics such as glass can be also used. When the support 2 has a constitution as shown in FIG. 1, it is required to be transparent (including light-transmissiveness) for permitting the beam for recording and reproduction to transmit therethrough. These materials for support may be also previously added with appropriate additives depending on the use.

RECORDING LAYER

The recording layer 3 can be formed from a thin film of a metal having high light reflectance. As the metal, there may be included chromium, titanium, iron, cobalt, nickel, copper, silver, gold, germanium, aluminium, magnesium, antimony, tellurium, lead, palladium, cadmium, bismuth, tin, selenium, indium, gallium or the like, and these metals can be used either singly or as an alloy comprising a combination of two or more kinds. Further, oxides of these metals can be also similarly used. The thickness of the recording layer comprising a thin film of these metals or alloys may be 100 to 1000 Å, more preferably 200 to 500 Å.

As a preferable example of the recording layer 3 in the present invention, a tellurium thin film as a simple substance metal may be used. Tellurium has a small thermal conductivity and an adequate degree of light absorptivity. In this case, the tellurium thin film may be either crystalline or amorphous. When the recording layer is formed of amorphous tellurium, it is preferable to previously crystallize the recording layer during recording. The recording layer in this case may have a thickness generally of 50 to 2000 Å, preferably 200 to 800 Å. Tellurium as a simple substance metal is susceptible to oxidation and inferior in humidity resistance, and also due to relatively higher melting point, the writing sensitivity is low and therefore it is generally believed to be undesirably used as the reflective layer for optical recording medium. However, on the other hand, the present inventors were interested in readiness of film preparation when using tellurium as the reflective layer and also the excellent characteristics possessed by the tellurium simple substance, and it is possible to obtain an optical recording medium excellent in stability of the characteristics with lapse of time by compensating for the drawbacks of tellurium as mentioned above while utilizing positively such good characteristics of the tellurium simple substance.

Also, in the present invention, the recording layer may also comprise a laminate of two layers, namely a first recording layer comprising a light-transmitting portion and a light-intercepting portion, and a second recording layer comprising a light reflective metal thin film. The first recording layer in this case can be formed by, for example, subjecting a light-sensitive material of which the unexposed portion becomes light-transmissive and the exposed portion becomes the light-intercepting portion to pattern exposure, followed by development. In some cases, a light-sensitive material of which the unexposed portion becomes light-transmissive may be subjected to pattern exposure and then developed to form the first recording layer. On the other hand, as the second recording layer, the same material as the material for the recording layer as mentioned above may be suitably used.

The light-sensitive material to be used for the above first recording layer may be constituted of, for example, (a) a transparent resin as the binder, (b) a photodecomposable developing inhibitor having a diazo group or an azide group and (c) a metal complex compound or a metal compound which becomes the metal nucleus developed by reduction. In such light-sensitive material, the photodecomposable developing inhibitor exists in an amount up to 100 parts by weight, preferably 20 to 50 parts by weight, and the metal complex compound or the metal compound which becomes the metal nucleus developed by reduction in an amount of 0.1 to 1000 parts by weight, preferably 1 to 10 parts by weight based on 100 parts by weight of the transparent resin as the binder. The developing inhibitor, the metal complex compound or the metal compound are dissolved or dispersed in the transparent resin as the binder, but preferably dissolved therein.

The image information brought about from the light-transmitting portion and the light-intercepting portion in the first recording layer as described above can function as the information itself or as the tracking and preformat during reading of the information.

Further, in the present invention, the recording layer can be constituted of an oxide of tellurium represented by $TeO_x$ and the sensitizing layer of an oxide of tellurium represented by $TeO_y$ (with proviso that x and y are positive real number, having the relationship of $x<y$), and such constitution will be described below.

SENSITIZING LAYER

The sensitizing layer 4 is formed by lamination so as to be in close contact with the recording layer 3. The sensitizing layer will promote thermochemically the physical deformation in the recording layer when an information pit is formed in the recording layer through occurrence of physical deformation by irradiation of an energy beam, consequently contributing to improvement of the information recording sensitivity. Further, by the sensitizing layer, substance transfer during pit formation onto the recording layer is rapidly absorbed or promoted, whereby it is not necessary to provide specifically a space for substance transfer in the recording medium as in the prior art. Accordingly, in the present invention, by providing such sensitizing layer, the structure of the recording medium can be made a structure of the sealed type. In the following, the respective embodiments are to be described.

(1) Thermoplastic Resin

When an information pit is recorded onto an optical recording medium, the recording layer is melted by absorption of the irradiated energy beam onto the recording layer, whereby the recorded portion (lower reflective portion relative to the portion not irradiated) is formed, and in this case it is difficult to form a recorded portion which is uniform and has desirable pit shape by only melting the recording layer.

In the first embodiment of the present invention, by use of a thermoplastic resin as the material for the sensitizing layer, excellent effect can be exhibited in improvement of recording sensitivity and stability with lapse of time. The reason why such effect can be exhibited is not necessarily clear, but it may be considered that the thermoplastic resin as the sensitizing layer is softened by the heat generated by the light irradiated on the recording layer, thereby absorbing (diffusing) effectively the material for the recording layer which is melted or evaporated, and yet this is accompanied with thermal deformation of the sensitizing layer, whereby such thermal deformation will contribute synergetically to uniformization and ready formability of the pit shape.

As the material for exhibiting such effect, various thermoplastic resins are available. Specific examples may include vinyl resins of homopolymers or copolymers of vinyl chloride, vinyl acetate, vinylidene chloride, petroleum resins such as polyethylene, polypropylene, polybutene, etc., acetal resins such as formal, butyral, etc., acrylic resins such as acryl, methacryl, polyacrylonitrile, etc., styrol resins such as polystyrol, ABS, AS, polyamide resins, etc.

Also, in the present invention, the above effect can be further promoted by addition of a light absorbing agent in the sensitizing layer.

As the light absorbing agent to be added in the thermoplastic resin, dyes, pigments and metal powder generally employed can be used. Specifically, there may be preferably used polymethine type dyes, pyrylium type, thiopyrylium type, squalilium type, croconium type, phthalocyanine type, dithiol metal complex type, naphthoquinone, anthraquinone type, triphenylmethane type, aminium type, diinmonium type, methylcaptonaphthol metal complex type dyes, or metal powder such as Te, Bi, Se, Ge, Zn, etc.

The thickness of such sensitizing layer may be preferably 1 to 100 μm.

(2) Silicon Compound Thin Film

In the second embodiment, by the use of a silicon compound thin film as the sensitizing layer, an optical recording medium having excellent recording sensitivity and yet having improved stability can be obtained.

As such silicon compound, there are silicon dioxide or organic silicon compounds containing silicon as the constituent element, and these compounds can be formed according to the method such as the sputtering method, the plasma polymerization method, etc.

Among them, in this embodiment, a silicon compound thin film formed by the plasma polymerization method is particularly excellent as the sensitizing layer.

Since the plasma polymerization is a dry process using no solvent, there is no deterioration or corrosion of the coated surface with the solvent, and therefore there is generated no film surface badness of the thin film formed on account of such causes. Accordingly, the layer provided according to the plasma polymerization method by use of a silicon type compound is a dense film without pinhole and yet has excellent heat insulating property. Thus, by forming a thin film having excellent insulating property in close contact with the recording layer, diffusion of the heat generated in the recording layer during recording can be prevented to promote melting and evaporation of the pit forming portion of the recording layer, whereby recording sensitivity can be remarkably improved. Also, since diffusion prevention of the heat can be effectively done, the influence of the heat on other layers can be made smaller to prevent denaturation of the constituent material, thereby improving also stability with lapse of time.

The silicon compound thin film constituting the sensitizing layer is formed according to the plasma polymerization method in a conventional manner, and as the silicon compound, silane type compounds, siloxane type compounds, functional group containing silicon compounds can be used. Specific examples may include silane compounds such as silane, disilane, monomethylsilane, dimethylsilane, tetramethylsilane, diethylsilane, tetramethyldisilane, hexamethylsilane, cyclohexyldimethylsilane, cyclotrimethylenedimethylsilane, dimethyldimethoxysilane, etc.; siloxane compounds such as hexamethyldisiloxane, tetramethyldisiloxane, pentamethyldisiloxane, cyclic dimethylsiloxane, etc.; further functional group containing silicon compounds such as vinyl trichlorosilane, vinyl triethoxysilane, vinyl tris(o-methoxyethoxy)silane, γ-glycidoxypropyltrimethoxysilane, γ-methacryloxypropyltrimethoxysilane, γ-mercaptopropyltrimethoxysilane, γ-aminopropyltriethoxysilane, γ-chloropropyltrimethoxysilane, etc.

Also, in the above method, since the sensitizing layer is formed by the plasma polymerization method, namely by use of a dry process without use of a solvent, there is no deterioration or corrosion of the coated surface with a solvent, to generate no film surface badness of the thin film formed on account of such causes, to give excellent recording characteristics.

(3) Fluoride or Carbide Thin Film

In this embodiment, by use of a metal or semi-metal fluoride or carbide as the sensitizing layer, an optical recording medium having excellent recording sensitivity and yet having improved stability can be obtained. A thin film comprising a metal or semi-metal fluoride or carbide is dense with pinhole being difficultly formed, and yet has excellent heat insulating property.

Thus, by forming a thin film having excellent insulating property in close contact with the recording layer, diffusion of the heat generated in the recording layer during recording can be prevented to promote melting and evaporation of the pit forming portion in the recording layer, whereby recording sensitivity can be remarkably improved. Also, since diffusion prevention of heat can be effectively done, the influence of the heat on other layers can be made smaller, whereby denaturation of the constituent material can be prevented to improve also stability with lapse of time.

As such sensitizing layer, specifically, fluorides such as $MgF_2$, $PbF_2$, $NbF_3$, $ZnF_2$, carbides such as $B_4C$, $Mo_2C$, NbC, SiC, TaC, TiC, $W_2C$, ZrC may be preferably used.

The thickness of such sensitizing layer may be preferably 100 to 10,000 Å, more preferably 300 to 1,000 Å.

(4) Hot Melt Type Adhesive

In this embodiment, by use of a hot melt type adhesive layer, excellent effect can be exhibited in improvement of recording sensitivity and stability with lapse of time. The reason why such effect can be exhibited is not necessarily clear, but similarly as in the above first embodiment, it may be considered that the sensitizing layer 4 itself is softened to be lowered in viscosity by the heat generated by the light irradiated on the recording layer 3, thereby absorbing (diffusing) rapidly and effectively the melted or evaporated light reflective layer material, and yet this is accompanied with thermal deformation of the sensitizing layer 4, whereby such thermal deformation will contribute synergetically to uniformization and ready formability of pit shape.

As the material for exhibiting such effect, hot melt type adhesives generally employed are available. Specific examples of the base polymer comprise a composition of one or two or more kinds of ethylene and ethylene copolymers such as polyethylene, ethylene-vinyl acetate copolymer (EVA), EVA modified polymer, ethylene-acrylate copolymer, ionomer resins, etc., polyester resins, polyamide resins, nylon resins, polypropylene resins, cellulose derivative type resins, polyvinyl type resins, polyurethane type resins, ethylene-propylene type resins, styrene-butylene block copolymer type resins, styrene-isoprene copolymer type resins, etc., and examples of tackifying resins comprise a composition of one or two or more kinds of rosins and rosin derivatives such as hydrogenated rosin, esterified rosin, polymerized rosin, etc., terpene type resins such as terpene resin, terpene-phenol copolymer, etc., aliphatic petroleum resins, aromatic petroleum resins, hydrogenated petroleum resins, cyclopentadiene type petroleum resins, styrene type resins, isoprene type resins, etc., which may be optionally added with various additives such as pigments, plasticizers, antioxidants, etc.

The thickness of the sensitizing layer as described above may be preferably 1 to 100 μm.

In the above embodiment, the hot melt type adhesive has also the function as an adhesive together with the function as the sensitizing layer at the same time. Accordingly, by use of such material as the sensitizing layer, improved effect of adhesiveness, closeness between the respective layers (namely between the sensitizing layer and the recording layer, or between the sensitizing layer and other layers) can be obtained along with the sensitizing effect. Also, in the above embodiment, since such adhesive effect can be obtained, when the sensitizing layer and another layer are laminated, it is not necessary to use separately an adhesive, thus contributing to simplification of the medium structure, thinner layer formation as well as simplification of the preparation steps.

$TeO_x/TeO_y$

In another preferred embodiment of the present invention, both the recording layer and the sensitizing layer can be constituted of oxides of tellurium.

According to the knowledge of the present inventors, by constituting the recording layer of a thin film of a tellurium oxide, and further laminating a sensitizing layer comprising a similar tellurium oxide thin film on the surface of the recording layer, and constituting the recording layer side with a weak oxide with relatively smaller degree of oxidation and also constituting the sensitizing layer side with a strong oxide with greater degree of oxidation than the above recording layer, both of sensitivity and weathering resistance (stability) were found to be improved. More specifically, a weak oxide thin film of tellurium has a sensitivity equal to the simple substance Te as the recording layer and yet has the excellent stability and weathering resistance, and further improved in weathering resistance by laminating a sensitizing layer comprising strong oxide thin film of Te on the recording layer, and even when a recording medium may be formed by bonding this laminate onto another substrate, there occurs no lowering in sensitivity and variance in recording pit shape.

Thus, the optical recording medium in this embodiment comprises a recording layer comprising an oxide of tellurium represented by the formula: $TeO_x$ (x is a positive real number) and a sensitizing layer comprising an oxide of tellurium represented by the formula: $TeO_y$ (y is a positive real number) laminated on a support, having the relationship of $x<y$ in the above formula.

In the above formula, x may be generally preferred to be within the range of $0<x\leq 1.5$. In this case, if x exceeds 1.5, reflectance and absorbance of light will be lowered to make information recording with laser impossible.

On the other hand, y in the formula may be preferably in the range of $0.5\leq y\leq 2$, and the above x and y have the relationship of $x<y$. In this case, if y is less than 0.5, the oxide becomes the state approximate to metallic Te to give no sensitizing effect, and may sometimes result in lowering in sensitivity in an extreme case undesirably.

Thus, the Te oxide can assume continuously various states from the state approximate to metallic Te having metallic luster to the state approximate to $TeO_2$ transparent (light-transmissive) to visible light corresponding to its oxidation state. Accordingly, when the Te oxide is viewed as the optical recording material, it can be broadly classified into the weakly oxidized state which has metallic luster, reflects sufficiently the recording light and has excellent energy absorption characteristic (namely recording sensitivity is excellent to form readily pit), and the strongly oxidized state which is excellent in light transmissivity and little in reflection and absorption of recording light (namely having no recording characteristic).

On the other hand, when the Te oxide is viewed in aspect of stability, it may be considered that stability is more excellent as the degree of oxidation is higher to be more approximate to $TeO_2$, but according to the knowledge of the present inventors, sufficiently good stability can be obtained practically if x in the oxide $TeO_x$ is in the range of 0.3 or more. In the weakly oxidized state of such extent, an excellent effect can be obtained also in the recording sensitivity, whereby overall excellent characteristics as the recording layer can be exhibited.

The thickness of the above recording layer 3 may be preferably 100 to 1500 Å, more preferably 300 to 700 Å. If the thickness of the recording layer is less than 100 Å, the light reflectance is inappropriately too small, while if it is over 1500 Å, sensitivity and recorded shape will be worsened.

In contrast, the thickness of the sensitizing layer 4 may be preferably in the range of 50 to 5000 Å, more preferably 200 to 1000 Å. If the sensitizing layer is less than 50 Å, it is too thin to not give a good sensitizing effect, while a thickness over 5000 Å is too thick, whereby to the contrary cracks are liable to be formed undesirably.

Meanwhile, also in the above embodiment, the sensitizing layer improves recording sensitivity and reproducing sensitivity onto the recording layer similarly as other embodiments as described above. That is, in the optical recording medium of the above embodiment, during recording of optical information, information recording is effected by forming pits on the recording layer with a laser beam, etc., while during reproduction of recording information, reading of recording information is effected by detecting the difference in light reflectance at the pit formed portion. Accordingly, the sensitizing layer contributes to improvement of sensitivity by making the difference in reflectance from the recording layer greater, and also has the following effects in addition thereto.

(a) It protects the recording layer to improve weathering resistance and stability of the optical recording medium.

(b) It has an extremely excellent effect in making regular the shapes of the recorded pits. That is, no recorded residual portion will be formed in the inner portions or the peripheral portions of the recorded pit, whereby recorded pits with smooth peripheral portions can be formed.

(c) For example, when the above optical recording medium is integrated by adhesion onto another, for example, substrate for card for the purpose of making a card, in the absence of such sensitizing layer, sensitivity will be remarkably lowered to give rise to variance in size of the recorded shape. Therefore, presence of the sensitizing layer is extremely effective in cancelling such problems, and the optical recording medium with a constitution as described above is particularly suitable when forming the so-called sealed type optical card.

Also, the optical recording medium of the above embodiment comprises the recording layer and the sensitizing layer which are constituted of the materials of the same compositional components only with different compositional ratios (namely the ratio of Te to oxygen), and therefore is very excellent in preventing undesirable reactions at the interface between both the layers, as compared with the case when employing the materials mutually different in the constituent components themselves. More specifically, generation of strain or stress based on physical, chemical interactions such as migration of the constituent elements at the interface between both the layers, or the difference in stress at the interface can be reduced as small as possible, and therefore an optical recording medium which is more stable physically, chemically and mechanically can be obtained. In the above embodiment, the above recording layer and the sensitizing layer may be also formed such that the compositional ratio of both the layers is under the state continuously varied. In other words, in the optical recording medium of the above embodiment, the respective Te/O ratios of the Te oxide constituting the recording layer and the Te oxide constituting the sensitizing layer may be varied continuously at the interface between both the layers, and it is only sufficient that the layers comprising at least the two kinds of the weak oxide ad the strong oxide substantially as described above may be formed.

(1) Thin Film Forming Method A

The Te oxide thin film constituting the recording layer and the sensitizing layer of the above embodiment can be obtained readily according to the reactive sputtering method. More specifically, by use of simple substance Te as the target, by effecting sputtering while discharging a gas mixture of oxygen and an inert gas, a thin film with a desired composition ratio can be formed. Such reactive sputtering method can be performed according to the method known in the art, and details thereof are disclosed in, for example, "Sputtering Phenomenon" (by Akira Kinbara, Tokyo Daigaku Shuppankai, 1984, pp. 120–132).

Formation of Te oxide thin film according to the reactive sputtering method as described above can be performed by means of a conventional sputtering device, but the sputtering may be performed by making the atmosphere within the device a gas mixture of argon and oxygen, and further within the device, there may be also applied such modification as provision of a jetting outlet of oxygen for the purpose of improving the reaction efficiency of oxygen.

The relationship between the mixing ratio of the inert gas to oxygen gas and the oxygen concentration in the thin film obtained is the qualitative relationship such that the oxygen amount in the thin film is increased as the content of the oxygen in the gas mixture is increased, and its quantitative relationship depends on the structure of the sputtering device employed, the discharging speed, the pressure during sputtering, the method of gas introduction, etc. and therefore the general relationship is different depending on the respective devices. However, calling attention on one device, if the profile of the running conditions is set, and then the oxygen concentration in the thin film is determined depending on the mixing ratio of the gases, and therefore reproducibility of preparation of thin film is good. Accordingly, within the same device, the recording layer and the sensitizing layer can be prepared substantially continuously by varying the gas mixing ratio.

The advantages for forming the thin film according to the reactive sputtering method are as described below.

(i) Since the oxidation state of Te can be controlled to a desired state by the mixing ratio of an inert gas and oxygen, it becomes possible to form both of the recording layer and the sensitizing layer by using only one kind of target. Generally speaking, a target comprising an alloy or a compound can be produced with difficulty as compared with a simple substance target and is more expensive.

(ii) Since the flow rates, mixing ratio of the gases introduced can be controlled easily and extremely precisely by use of a device such as mass flow controller, excellent reproducibility in preparation of thin film can be obtained. In contrast, when a thin film of an alloy or compound is prepared according to the vapor deposition method of the prior art, etc., it is generally difficult to prepare a thin film with good state of reproducibility of the composition ratio.

(iii) The deposition speed of the film is great to give excellent productivity. When a Te oxide is used as a target, the deposition speed for the target is low to give inferior productivity. In contrast, according to the above method, since a simple substance Te is used as a target, it becomes possible to effect deposition at high speed and yet at low temperature and within a short time, whereby improvement of both productivity and quality can be effected.

(iv) A conventional sputtering device can be used as such.

(2) Thin Film Forming Method B

The recording layer and the sensitizing layer of the above embodiment can be also prepared by irradiating ion beam comprising oxygen containing gas onto said support simultaneously with evaporation of Te toward the support according to the vacuum vapor deposition method.

The method and the device for preparing a two-component system thin film as described above are disclosed in Japanese Patent Application No. 53385/1986 already proposed by the present inventors, and the method disclosed in this specification can be employed by varying the conditions.

The film preparation conditions in the case of applying the above method for the present invention are as follows.

(a) Conditions common to film preparation of both the recording layer and the sensitizing layer:
Preliminary evacuation: $10^{-5}$ Torr
Introduced gases: oxygen and inert gas
Film forming speed of Te: 1-500 Å/sec.
Vacuum degree: $3 \times 10^{-5} - 1 \times 10^{-3}$ Torr (outside of this range, actuation of ion gun becomes unstable)

(b) Formation of recording layer:
Operational conditions of ion gun:
Voltage applied: 50-1000 V
In this case, at less than 50 V, the ion current can be controlled with difficulty, while in excess of 1000 V, the sputtering effect is increased to make film preparation difficult.
Ion current density: 10-300 $\mu A/cm^2$
In this case, at less than 10 $\mu A/cm^2$, oxidation is insufficient to lower stability with lapse of time, while in excess of 300 $\mu A/cm^2$, oxygen becomes excessive to bring about lowering in recording sensitivity.
Film thickness: 100-1500 Å
At less than 100 Å, reflectance is insufficient, while in excess of 1500 Å, contrariwise recording sensitivity is lowered.

(c) Formation of sensitizing layer:
Operational conditions of ion gun:
Acceleration voltage: 50-1000 V
In this case, at less than 50 V, the ion current can be controlled with difficulty, while in excess of 1000 V, the sputtering effect is increased to make film preparation difficult.
Ion current density: 200-1000 $\mu A/cm^2$
In this case, at less than 200 $\mu A/cm^2$, oxidation is insufficient to lower recording sensitivity, while in excess of 1000 $\mu A/cm^2$, the support is subject to heat loss by the ion current undesirably.
Film thickness: 50-5000 Å
At less than 50 Å, recording sensitivity is lowered, while in excess of 5000 Å, contrariwise the problem of peel-off of thin film will be caused.

The method of using the ion beam irradiation and the vapor deposition in combination as described above has the following advantages.

(a) The composition of the desired thin film can be controlled easily. That is, only by controlling the acceleration voltage and the ion current of the ion gun to desired state, a thin film with a desired composition can be obtained, and therefore controllability is extremely excellent.

(b) Since the reactivity during formation of an oxide is high, thin film formation can be effected under a relatively lower temperature (100° C. or less), a good thin film can be formed also when the transparent support comprises a material relatively weak in resistance to heat such as plastic, etc.

(c) Since film formation can be effected under high vacuum, entrainment of an impurity into the thin film can be prevented as far as possible, whereby an optical recording medium with excellent quality can be prepared.

SPECIFIC EXAMPLE OF LAYER CONSTITUTION

As shown in FIG. 2, in the DRAW type optical recording medium 1 of the present invention, a substrate 6 may be also formed through an adhesive layer 5 on the sensitizing layer 4 side. The substrate 6 can be selected from any desired material depending on the use, the final desired product. Further, the substrate 6 (or the substrate 2) may have also another recording means such as magnetic stripe, hologram, imprint, photograph, bar code, printing in general formed thereon.

The adhesive layer 5 integrates by bonding the substrate 6 to the sensitizing layer 4, and the adhesive is selected in view of the materials above and below the adhesive surface. Specifically, an adhesive which is of the type curable under heating or at a temperature of 50° C. or lower and can give sufficiently good adhesive force between the upper and lower materials can be preferably used.

Figure 3:
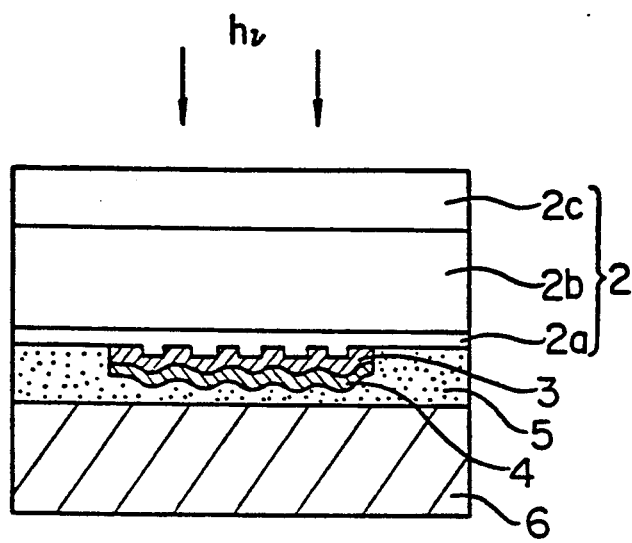

The embodiment shown in FIG. 3 is an example when the transparent support 2 is constituted of an unevenness forming layer 2a for tracking, a transparent plate 2b and a surface protective layer 2c. In this case, the surface protective layer 2c may be formed or not. Also, a primer layer (not shown) may be also provided between these respective layers.

Figure 4:
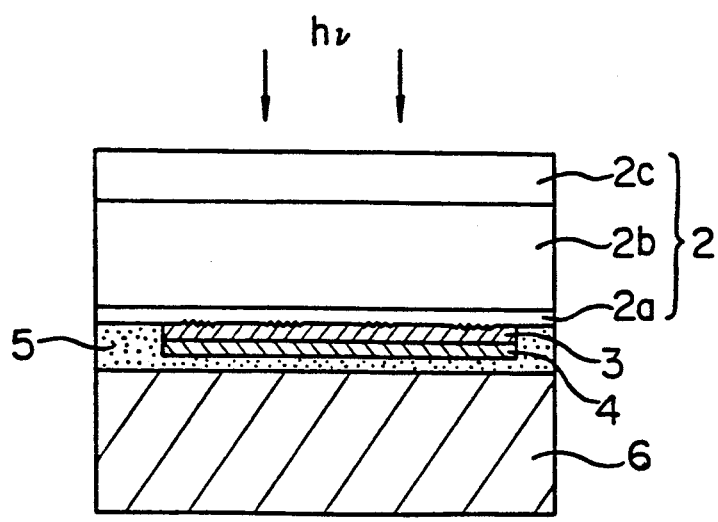

The unevenness forming layer for tracking functions as the guide groove for tracking during recording and reading of information, and its shape may be one applied with fine unevenness or a matte working for scattering light along the guide groove as shown in FIG. 4.

The surface protective layer 2c is provided at the outermost layer, has high hardness, comprises preferably a material with smaller refractive index of light than the transparent plate 2c, and by selecting such a material, the recording and producing sensitivity can be further enhanced by the action of preventing undesirable reflection of the laser beam during recording and reproduction. Specifically, cured resins obtained by curing of silicon type, acrylic type, melamine type, polyurethane type or epoxy type resins can be used.

Figure 5:
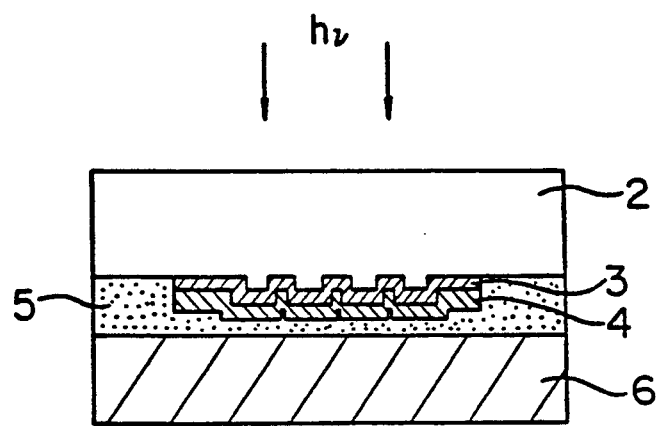
Figure 6:
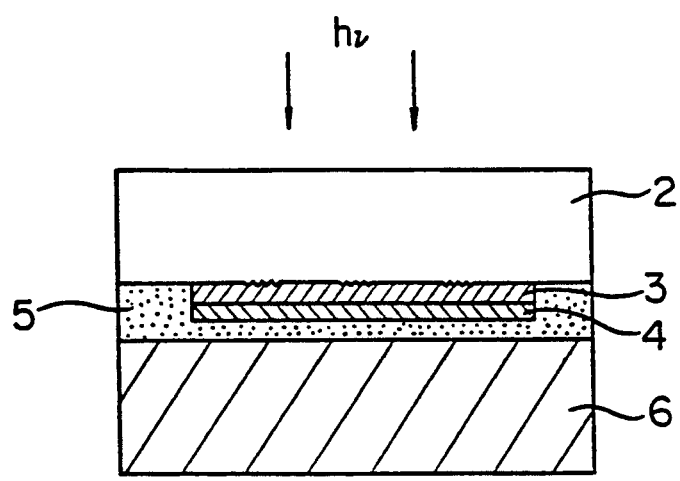

FIG. 5 and FIG. 6 are each an example when an unevenness forming layer for tracking is provided integrally in the transparent support 2 in FIG. 3 and FIG. 4, respectively.

In the embodiment of the optical recording medium shown in FIG. 3-FIG. 6 as described above, since the recording layer and the sensitizing layer are built in and sealed internally of the laminate, and the respective layers have the constitution closely contacted with each other, and therefore have excellent weathering resistance to external environment to be advantageous in both of improvement of stability with lapse of time and improvement of sensitivity.

Figure 7:
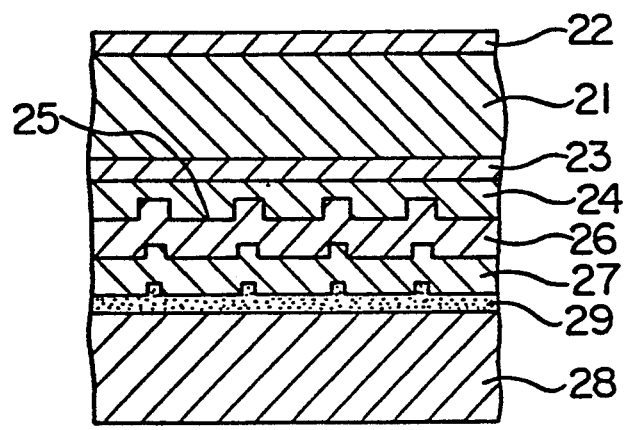

Next, referring to FIG. 7, a specific example of the method for preparing of the close adhesion type and the sealed type according to the present invention is to be described.

First, a transparent sheet 21 is prepared, one surface of the transparent sheet is coated with a coating solution of a curable resin according to the known method, followed by drying and curing, or a metal oxide is formed as the thin film according to the sputtering method or a surface protective layer 22 is formed according to the plasma polymerization method.

Next, the transparent sheet having the surface protective layer 22 formed thereon is coated on the surface where there is no surface protective layer 22 with a coating solution of a material of primer, followed by drying to form a primer layer 23. As described below, the primer layer 23 can be omitted.

On the primer layer 23 on the surface opposite to the surface protective layer 22 of the transparent sheet 21, or on the surface of the transparent sheet 21, a coating solution of a curable type resin is applied and cured to form a tracking forming layer 24.

During formation of a tracking forming layer 24, a groove for tracking 25 can be also formed, and after coating of the coating solution of the curable resin, with a matrix for imparting a predetermined shape of the guide groove 25 for tracking is closely contacted thereon, and under such state the resin in the coating solution may be cured.

On the tracking forming layer 24, a thin film of a metal or oxide or alloy thereof is formed according to the thin film forming method as described above such as vacuum vapor deposition or sputtering to provide a recording layer 26. In the case of other than a metal or an oxide or alloy thereof, the recording layer 26 is formed acccording to a suitable thin film forming method or coating method.

The sensitizing layer 27 to be formed on the recording layer 26 can be formed according to the vacuum vapor deposition method, the sputtering method, etc. in the case of a metal oxide, nitride, sulfide; can be formed according to the spin coating method, the gravure coating method in the case of a thermoplastic resin or a hot melt type adhesive; and can be prepared according to the sputtering method or the plasma polymerization method in the case of a silicon compound thin film, a hydrocarbon compound thin film.

The transparent sheet 21 has the respective layers formed on both surfaces thereof, and either one of the surfaces may be applied with working first, provided that the mutual relationship of the respective layers is not changed.

Separately from the above working for the transparent sheet 21, a substrate 28 is prepared. The substrate 28 is applied with reinforcement or has another recording means other than the optical recording layer formed thereon as described above.

The transparent sheet 21 finished of working, and the substrate 28 are combined after coating an adhesive 29 on either one or both of the surface of the substrate 28 and the surface of the sensitizing layer 27 of the lower surface of the transparent sheet 21, and after taking optionally an open time, and closely adhered according to the pressing method or according to the hot pressing method by use of a hot plate to give an optical recording medium.

Figure 8:
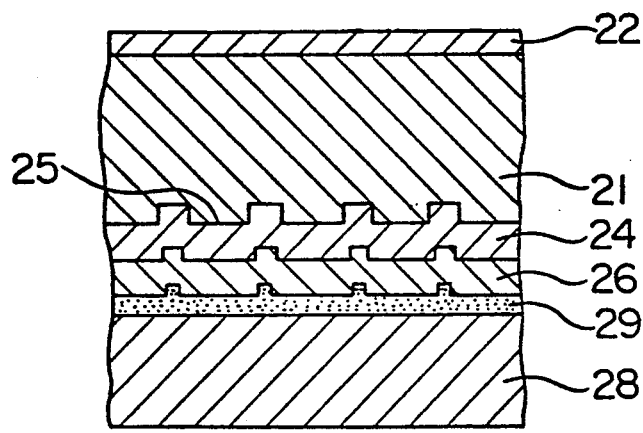

In the present invention, as shown in FIG. 8, during formation of the transparent sheet 21, a guide groove 25 for tracking can be molded as integrated therewith, whereby a medium constitution further simplified can be obtained. In this case, as the method for preparation of the transparent sheet, injection molding, press molding method by use of a resin such as acryl, polycarbonate, etc. can be employed.

In the following, the materials, etc. for the respective layers in the above layer constitution are described in more detail.

The tracking forming layer 24 is provided for regulating the position of the optical information during recording and reproduction on the light reflective layer, and should preferably have humidity resistance and weathering resistance for protection of the recording layer 26, and may be preferably a material having insulating property for improvement of sensitivity. Further, for formation of a guide groove for tracking, it should preferably have a necessary form imparting property. As the material satisfying these points, curable resins, particularly ionized radiation curable resins are desirable as one capable of avoiding the influence of heat during curing.

Specifically, prepolymers or oligomers having ethylenically unsaturated bonds in the molecule as mentioned below, and the monomers optionally added with known sensitizers may be applied by coating, and cured by irradiation of ionized radiation such as UV-ray, electron beam or γ-ray to form a tracking forming layer which functions as both the protective and sensitizing layers.

1) Prepolymers or oligomers, and monomers having ethylenically unsaturated bonds in the molecule such as polyester (meth)acrylate, epoxy (meth)acrylate, urethane (meth)acrylate, polyether (meth)acrylate, polyol (meth)acrylate, melamine (meth)acrylate.

2) Monomers having ethylenically unsaturated bonds in the molecule, including (meth)acrylic acid esters such as methyl (meth)acrylate, ethyl (meth)acrylate, propyl (meth)acrylate, butyl (meth)acrylate, 2-ethylhexyl (meth)acrylate, methoxyethyl (meth)acrylate, ethoxyethyl (meth)acrylate, methoxybutyl (meth)acrylate, ethoxybutyl (meth)acrylate, butoxyethyl (meth)acrylate, lauryl (meth)acrylate, phenyl (meth)acrylate, etc.; unsaturated carboxylic acid amides such as (meth)acrylic acid amide; substituted amino alcohol esters of unsaturated carboxylic acids such as 2-(N,N-dimethylamino)ethyl (meth)acrylate, 2-(N,N-dimethylamino)methyl (meth)acrylate, 2-(N,N-diethylamino)propyl (meth)acrylate, etc.; and otherwise ethylene glycol di(meth)acrylate, propylene glycol di(meth)acrylate, neopentyl glycol di(meth)acrylate, 1,6-hexanediol diacrylate, diethylene glycol di(meth)acrylate, triethylene glycol di(meth)acrylate, dipropylene glycol di(meth)acrylate, trimethylolpropane tri(meth)acrylate, etc.

As the sensitizer suitable for the prepolymer or the oligomer, and the monomer having unsaturated bonds to be used for such tracking forming layer which functions as both the protective and sensitizing layers, specific examples may include benzophenone type and benzoin ether type sensitizers.

The tracking forming layer 24 may have a thickness of 3 to 20 μm, more preferably 5 to 7 μm.

The primer forming layer 23 is provided directly for the sense to improve the adhesion strength between the tracking forming layer 24 and the upper layer transparent sheet 7, but it is not necessarily required when sufficient adhesion strength is obtained between the tracking forming layer 24 and the upper layer transparent sheet 7. As the material constituting the primer layer 23, a polymer of vinyl chloride or vinyl acetate resin or copolymers of these may be employed.

The transparent sheet 21 protects the optical recording material, and plays a role as a substrate in preparing the optical recording material. Since optical information is recorded or reproduced by irradiating a laser beam from the transparent sheet 21 side, a material having sufficient transmittance relatively to a laser beam, particularly to the wavelength of the laser beam of a semiconductor laser which is small in scale and high in output is suitable as the transparent sheet 21. Specific examples may include transparent films such as polyethylene resin, acrylic resin, polycarbonate resin, copolymer or mixture of polystyrene and polycarbonate, or polyethylene terephthalate resin, etc., or glass, and its thickness may be 100 μm to 1 mm.

The surface protective layer 22 is provided as the upper layer on the transparent sheet 21, having desirably higher hardness than the transparent sheet 21 and also lower refractive index of light than the transparent sheet 21, and by selecting so, sensitivity during recording and reproduction can be enhanced through the action of preventing the reflection of the laser beam during recording and reproduction.

As the material for the surface protective layer 22, the materials used in the method known as the surface curing method may be employed, including, for example, cured resins obtained by curing of silicon type, acrylic type, melamine type, polyurethane type, epoxy type resins, and metal oxides such as $SiO_2$, as specific examples.

Figure 9:
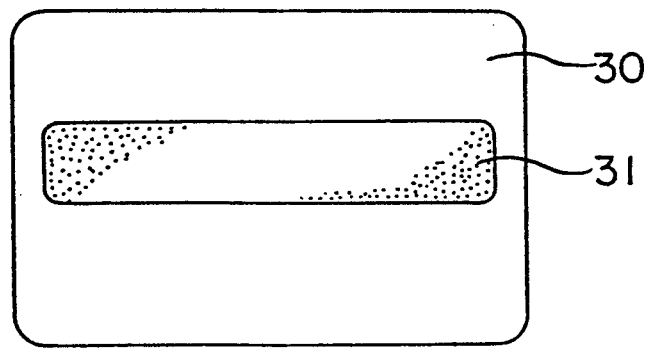
FIG. 9 is a sectional view of the DRAW type optical recording medium according to the present invention.

FIG. 9 is a plan view when the optical recording medium is used as the optical card. That is, by forming an optical recording medium 31 in the card substrate 30, an optical card can be obtained. More specifically, by forming an optical recording medium 31 embedded in the card substrate 30 (in this case, it is preferred that the surface of the optical recording medium 31 may be on the same plane as the card substrate 30 for card running stability during recording and reproduction in the recording and reproducing device), or forming the optical recording medium 31 by adhesion with an adhesive, etc. onto the surface of the card substrate 30, an optical card can be obtained. Further, an optical card can be also prepared according to the method as shown in Examples as described hereinafter.

The present invention is described below by referring to Examples, but the present invention is not limited to these Examples at all.

EXAMPLE A-1

A polycarbonate film (produced by Teijin K.K., Japan, trade name: Panlite, thickness: 400 μm) was prepared as a transparet sheet (support), and a composition for formation of surface protective layer with a composition shown below was applied on one surface according to the spiral gravure reverse coating method to form a surface protective layer with a thickness of 2 μm.

On the other surface of the transparent sheet, a tracking forming layer with a guide groove for tracking, a recording layer and a sensitizing layer were successively formed as described below.

First, 5 parts by weight of a photosensitizer were added to 100 parts by weight of an oligoester acrylate (produced by Toa Gosei K.K., Japan, trade name M-5700), and the mixture was applied by the roll coating method at a ratio of 5 g/m², a matrix with the reverse shape of the guide groove for tracking was pushed against the coated surface and laminated by use of a roll. After cured by irradiation of UV-ray, the matrix was peeled off to form a tracking forming layer with a guide groove for tracking. As the matrix, a sheet having a tracking guide groove transferred with a UV-ray curable resin from a mold was employed.

On the tracking forming layer, by use of tellurium/copper/lead = 80/15/5 (weight ratio) as the sputtering target, a recording layer of 300 Å was formed. Sputtering was effected by use of a high frequency power source of 13.56 MHz under the conditions of an output of 100 W and an argon gas pressure of $1 \times 10^{-3}$ Torr.

On the recording layer, by use of $SiO_2$ as the sputtering target, according to the sputtering method under otherwise the same conditions as in formation of the recording layer, a sensitizing layer with a thickness of 1000 Å was formed.

Separately, a polyvinyl chloride resin film (produced by Mitsubishi Jushi K.K., Japan, thickness 350 μm) was prepared, applied with printing of predetermined matters, then coated on the surface to be adhered to this film with a polyurethane type two-component adhesive (produced by Alps Kagaku K.K., Japan, trade name: Alpon) and laminated on the sensitizing layer side of the transparent sheet having the above respective layers formed thereon by use of a roll to obtain an optical recording medium.

COMPARATIVE EXAMPLE A-1

For comparison, an optical recording medium was obtained in the same manner as in Example A-1 except for omitting the sensitizing layer.

COMPARATIVE EXAMPLE A-2

For comparison, an optical recording medium was obtained in the same manner as in Example A-1 except for omitting the tracking forming layer and the sensitizing layer.

The optical recording materials obtained in Example A-1 and Comparative Example A-1 were stored in a thermostat and humidistat tank of a temperature of 40° C. and a relative humidity of 90%, and then optical recording was effected on the optical recording materials by irradiation of a laser beam from the surface protective layer side under the conditions of a wavelength of 830 nm, an output of 7 mw and a pulse width of 25 μsec. As the result, in the recording material of Example A-1, pits with good shape of 3 μm in pit diameter could be obtained, but recording was impossible in the recording material of Comparative Example A-1.

When recording was immediately effected on the recording materials obtained in Example A-1 and Comparative Example A-2 under the same conditions as described above, pits with good shape of 3 μm in pit diameter could be obtained in the recording material of Example A-1, but recording was impossible in the recording material of Comparative Example A-2.

EXAMPLE A-2

An optical recording medium was obtained in the same manner as in Example A-1 except for providing a sensitizing layer with a thickness of 100 Å by use of $Si_3N_4$ as the sputtering target. When recording was effected under the same conditions as described above, pits with good shape of 28 μm in diameter could be obtained.

EXAMPLE A-3

An optical recording medium was obtained in the same manner as in Example A-1 except for providing a sensitizing layer with a thickness of 100 Å by use of $Si_3N_4$ as the sputtering target. When recording was effected under the same conditions as described above, pits with good shape of 28 μm in diameter could be obtained.

EXAMPLE B-1

A polycarbonate film (produced by Teijin K.K., Japan, trade name: Panlite, thickness: 400 μm) was prepared as a transparent sheet (support), and a composition for formation of surface protective layer with a composition shown below was applied on one surface according to the spiral gravure reverse coating method to form a surface protective layer with a thickness of 2 μm.

COMPOSITION FOR FORMATION OF SURFACE PROTECTIVE LAYER: SILICON TYPE UV-CURABLE SURFACE CURING MATERIAL (PRODUCED BY TORAY)

On the other surface of the transparent sheet, a tracking forming layer with a guide groove for tracking, a recording layer and a sensitizing layer were successively formed as described below.

First, 5 parts by weight of a photosensitizer were added to 100 parts by weight of an oligoester acrylate (produced by Toa Gosei K.K., Japan, trade name M-5700), and the mixture was applied by the roll coating method at a ratio of 5 g/m², a matrix with a reverse shape of the guide groove for tracking was pushed against the coated surface and laminated by use of a roll. After cured by irradiation of UV-ray, the matrix was peeled off to form a tracking forming layer with a guide groove for tracking. As the matrix, a sheet having a tracking guide groove transferred with a UV-ray curable resin from a mold was employed.

Next, on the tracking forming layer, by use of tellurium simple substance as the sputtering target, a recording layer of 300 Å was formed. Sputtering was effected by use of a high frequency power source of 13.56 MHz under the conditions of an output of 100 W and an argon gas pressure of $1 \times 10^{-3}$ Torr.

Next, on the recording layer, by use of $SiO_2$ as the sputtering target, according to the sputtering method under otherwise the same conditions as in formation of the recording layer, a sensitizing layer with a thickness of 1000 Å was formed.

Separately, a polyvinyl chloride resin film (produced by Mitsubishi Jushi K.K., Japan, thickness 350 μm) was prepared, applied with printing of predetermined matters, then coated on the surface to be adhered of this film with a polyurethane type two-component adhesive (produced by Alps Kagaku K.K., Japan, trade name: Alpon) and laminated on the sensitizing layer side of the transparent sheet having the above respective layers formed thereon by use of a roll to obtain an optical recording medium.

COMPARATIVE EXAMPLE B-1

For comparison, an optical recording medium was obtained in the same manner as in Example B-1 except for omitting the sensitizing layer.

EXAMPLE B-2

An optical recording medium was prepared in the same manner as in Example B-1 except for using a polycarbonate substrate (thickness 600 μm) having tracking unevenness formed thereon according to the injection molding method as the transparent sheet.

TEST EXAMPLE

On the optical recording media obtained in Example B-1 and Comparative Example B-1, by use of a semiconductor of a wavelength of 830 mm and an output of 7 mW, writing was effected by varying the pulse width and evaluate.

Figure 10:
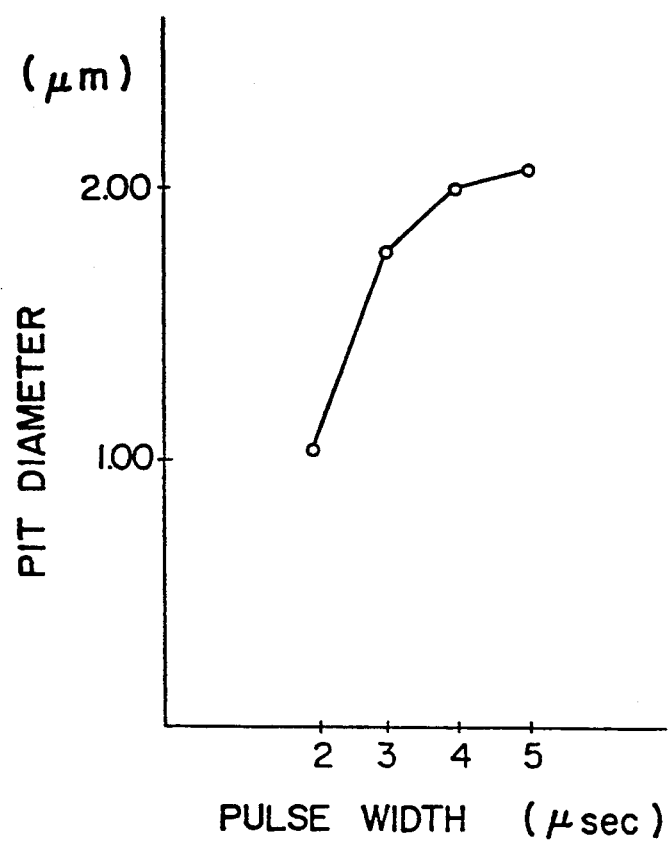
FIG. 10 through FIG. 15 are each a graph representing the relationship between the pulse width and the pits diameter formed when performing writing of information with a laser beam.

As the result, in the optical recording medium of Example B-1, as shown in FIG. 10, writing becomes possible in the vicinity of the pulse width of 24 μsec. However, in the optical recording medium of Comparative Example 1, no writing of data could be done.

On the other hand, for the optical recording medium of Example B-2, writing was effected from the transparent sheet side with a semiconductor laser of a wavelength of 830 mm by use of a lens of $N_A$ 0.3, whereby substantially the same result as in Example B-1 was obtained.

EXAMPLE -3 (PREPARATION EXAMPLE OF OPTICAL CARD)

A polycarbonate film (produced by Teijin K.K., Japan, trade name: Panlite, thickness: 400μ) was prepared as a transparent sheet (support), and a composition for formation of surface protective layer with a composition shown below was applied on one surface according to the spiral gravure reverse coating method to form a surface protective layer with a thickness of 2 μm. Composition for formation of surface protective layer:

SILICON TYPE UV-CURABLE SURFACE CURING MATERIAL (PRODUCED BY TORAY)

On the other surface of the transparent sheet, a tracking forming layer with a guide groove for tracking, a recording layer and a sensitizing layer were successively formed as described below.

First, 5 parts by weight of a photosensitizer were added to 100 parts by weight of an oligoester acrylate (produced by Toa Gosei K.K., Japan, trade name M-5700), and the mixture was applied on the dimensions of 80 mm × 20 mm by the roll coating method at a ratio of 5 g/m², a matrix with a reverse shape of the guide groove for tracking was pushed against the coated surface and laminated by use of roll. After cured by irradiation of UV-ray, the matrix was peeled off to form a tracking forming layer with a guide groove for tracking. As the matrix, a sheet having a tracking guide groove transferred with a UV-ray curable resin from a mold was employed.

Next, on the tracking forming layer, by use of tellurium simple substance as the sputtering target, a recording layer of 300 Å was formed. Sputtering was effected by use of a high frequency power source of 13.56 MHz under the conditions of an output of 100 W and an argon gas pressure of $1 \times 10^{-3}$ Torr.

Next, on the recording layer, by use of $SiO_2$ as the sputtering target, according to the sputtering method under otherwise the same conditions as in formation of the recording layer, a sensitizing layer with a thickness of 1000 Å was formed.

Separately, a polyvinyl chloride resin film (produced by Mitsubishi Jushi K.K., Japan, thickness 350 μm) was prepared, applied with printing of predetermined matters, then coated on the surface to be adhered of this film with a polyurethane type two-component adhesive (produced by Alps Kagaku K.K., Japan, trade name: Alpon) with a thickness of 10μ and laminated on the sensitizing layer side of the transparent sheet having the above respective layers formed thereon by use of a roll to obtain an optical recording medium. The optical recording medium obtained was punched into card dimensions to obtain an optical card with a thickness of 0.75 mm, having an optical recording portion (80 mm × 20 mm).

EXAMPLE C-1

As a transparent sheet (support), an acrylic resin plate (produced by Nitto Kogyo Jushi, Japan, thickness 400 μm) was prepared and a tracking forming layer with a guide groove for tracking, a recording layer and a sensitizing layer were successively formed.

First, 95 parts by weight of an oligoester acrylate (produced by Toa Gosei Kagaku K.K., Japan, trade name M-8030) added with 5 parts by weight of a photosensitizer were sandwiched between an acrylic resin plate and a matrix with the reverse shape of the guide groove for tracking, and laminated by use of a roll to 5 g/m². After curing of the oligoester acrylate by irradiation of UV-ray, the matrix was peeled off to form a tracking forming layer with a guide groove for tracking.

On the tracking forming layer, by use of tellurium as the sputtering target, a recording layer of 350 Å was formed according to the sputtering method. Sputtering was effected by use of a high frequency power source under the conditions of an output of 50W and an argon gas pressure of $1 \times 10^{-2}$ Torr.

On the recording layer, 1 part by weight of a polyvinyl acetate (produced by Nippon Gosei Kagaku K.K., Japan, trade name Goseneel K50-Y2) added with 3 parts by weight of methyl isobutyl ketone under thorough stirring was applied by spin coating to form a sensitizing layer. The thickness of the sensitizing layer was 1 to 2 μm.

Separately, a polyvinyl chloride resin film (produced by Mitsubishi Jushi K.K., Japan, thickness 350 μm) was prepared, applied with printing of predetermined matters, then coated on the surface of the film to be adhered with a polyurethane type two-component adhesive (produced by Toray K.K., Japan, trade name HU1226) and laminated on the sensitizing layer side of the sheet having the above respective layers formed thereon by use of a roll, to obtain an optical recording medium.

When the optical recording medium obtained was irradiated from the transparent sheet side with a semiconductor laser of a wavelength of 830 nm by use of a lens of $N_A$ 0.3, pits with good hole shape of about 2.2 μmφ could be written at an output of 7 mW with a pulse width of 2 μsec.

EXAMPLE C-2

An optical recording medium was obtained similarly as in Example C-1 by adding 10% by weight of a near IR-ray absorbing dye (produced by Mitsui Toatsu Fine K.K., Japan, PA-1006) into the polyvinyl acetate resin of the sensitizing layer.

When the optical recording medium was irradiated from the transparent sheet side with a semiconductor laser of a wavelength of 830 nm by use of a lens of $N_A$ 0.3, pits with good hole shape of about 2.2 μmφ could be written at an output of 7 mW with a pulse width of 3 μsec.

EXAMPLE C-3

An optical recording medium was obtained similarly as in Example C-1 by use of an alloy with a composition ratio of Te:80 percent, Cu:15 percent and Pb:5 percent as the sputtering target.

When the optical recording medium was irradiated from the transparent sheet side with a semicondutor laser of a wavelength of 830 nm by use of a lens of $N_A$ 0.3, substantially the same results as in Example C-1 were obtained.

EXAMPLE C-4

An optical recording medium was obtained similarly as in Example C-1 by use of an acrylic resin plate having tracking unevenness formed thereon according to the injection molding method (thickness 600 μm) as the transparent sheet.

When the optical recording medium was irradiated from the transparent sheet side with a semiconductor laser of a wavelength of 830 nm by use of a lens of $N_A$ 0.3, substantially the same results as in Example C-1 were obtained.

EXAMPLE C-5 (PREPARATION EXAMPLE OF OPTICAL CARD)

The optical recording media obtained in Examples C-1 to C-4 were respectively punched into card dimensions to obtain optical cards having a thickness of 0.75 mm and an optical recording portion (80 mm × 20 mm).

EXAMPLE D-1

On an acrylic resin support with a thickness of 0.8 mm provided with unevenness for beam following (tracking), a thin Te film with a thickness of 600 Å was provided according to the sputtering method to prepare a recording medium. As the target used for sputtering, Te of 99.9% purity was employed. Sputtering was effected in Ar atmosphere of $1.0 \times 10^{-2}$ Torr, and the Te film deposition speed at this time was 25 Å/sec.

On the recording layer thus provided, a sensitizing layer of a silicon containing organic material with a thickness of 1000 Å according to the plasma polymerization method was provided. The plasma polymerization method is the chemical vapor deposition method in which a starting material contained in a carrier gas is delivered into a vessel evacuated to vacuum, discharging is effected while maintaining a constant pressure and a film is formed as the result of chemical reaction of the active species, radicals, etc. formed by discharging on a substrate of low temperature. In this Example, hydrogen gas was used as the carrier gas, and tetramethylsilane $((CH_3)_4Si)$ as the starting material. The starting material was contained in the carrier gas as follows. That is, hydrogen gas of 1 kg/cm² was bubbled into liquid tetramethylsilane maintained at 0° C. at a flow rate of 40 cc/min., whereby tetramethylsilane was contained as the vapor in the hydrogen gas. The flow rate of the gaseous mixture of hydrogen and tetramethylsilane at this time was 53 cc/min.

The gas mixture obtained as described above was introduced into a vacuum vessel and the pressure was maintained at 0.5 Torr by controlling the discharging valve. The pressure was measured by a differential pressure type vacuum gauge. Discharging was generated by applying a high frequency of 125 KHz between the two parallel flat plate electrodes placed horizontally. At this time, the film deposition speed was 10 Å/sec. The film obtained was found to have an amorphous structure in which silicon, carbon and hydrogen were crosslinked, as determined by IR-absorption analysis and photoelectric spectroscopic analysis.

Figure 11:
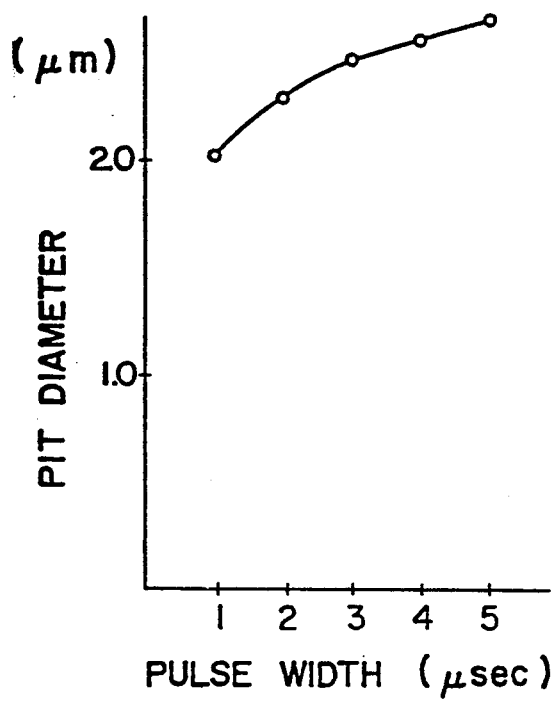

The recording diameter when writing was effected in the optical recording medium as obtained above at an oscillation wavelength of 830 nm and an input power into the medium of 7 mW was as shown in FIG. 11. The optical recording medium was adhered to a vinyl chloride resin with the sensitizing layer side as the inner side. As the adhesive layer, an urethane type adhesive (Hisole produced by Toray) was employed.

Figure 12:
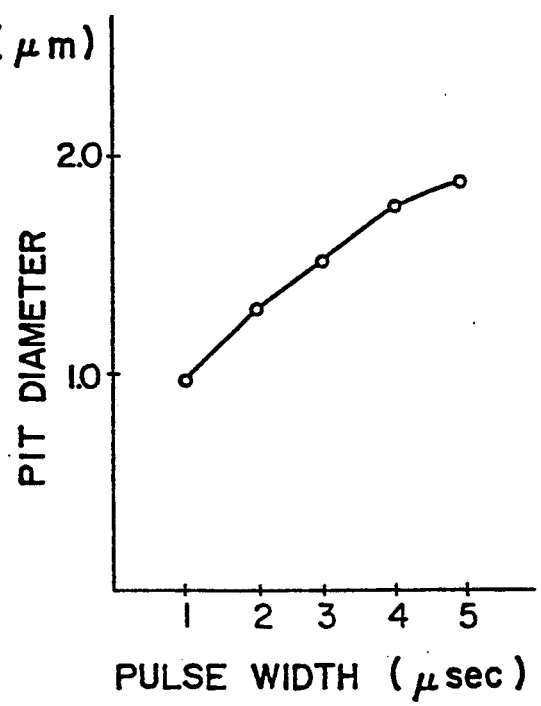

The recording diameter when writing was effected with laser onto the sealed structure type optical recording medium was as shown in FIG. 12. By sealing, although reduction of recording diameter occurs, even the case of practically sealed structure has a satisfactory relationship between recording diameter and recording speed.

EXAMPLE D-2

As a transparent sheet (support), an acrylic resin plate (produced by Nitto Kogyo Jushi, Japan, thickness 400 μm) was prepared and a tracking forming layer with a guide groove for tracking a recording layer and a sensitizing layer were successively formed.

First, 95 parts by weight of an oligoester acrylate (produced by Toa Gosei Kagaku K.K., Japan, trade name M-8030) added with 5 parts by weight of a photosensitizer were sandwiched between an acrylic resin plate and a matrix with the reverse shape of the guide groove for tracking, and laminated by use of a roll to 5 g/m². After curing of the oligoester acrylate by irradiation of UV-ray, the matrix was peeled off to form a tracking forming layer with a guide groove for tracking.

On the tracking forming layer, a thin Te film with a thickness of 600 Å was provided according to the sputtering method to prepare a recording layer. As the target used for sputtering, Te of 99.9% purity was employed. Sputtering was effected in Ar atmosphere of $10 \times 10^{-2}$ Torr at a Te film deposition speed of 25 Å/sec.

On the recording layer thus provided, a sensitizing layer of a silicon containing organic material with a thickness of 1000 Å according to the plasma polymerization method was provided. The plasma polymerization method is the chemical vapor deposition method in which a starting material contained in a carrier gas is delivered into a vessel evacuated to vacuum, discharging is effected while maintaining a constant pressure and a film is formed as the result of chemical reaction of the active species, radicals, etc. formed by discharging on a substrate of low temperature. In this Example, hydrogen gas was used as the carrier gas, and tetramethylsilane $((CH_3)_4Si)$ as the starting material. The starting material was contained in the carrier gas as follows. That is, hydrogen gas of 1 kg/cm² was bubbled into liquid tetramethylsilane maintained at 0° C. at a flow rate of 40 cc/min., whereby tetramethylsilane was contained as the vapor in the hydrogen gas. The flow rate of the gaseous mixture of hydrogen and tetramethylsilane at this time was 53 cc/min.

The gas mixture obtained as described above was introduced into a vacuum vessel and the pressure was maintained at 0.500 Torr by controlling the discharging valve. The pressure was measured by a differential pressure type vacuum gauge. Discharging was generated by applying a high frequency of 125 KHz between the two parallel flat plate electrodes placed horizontally. At this time, the film deposition speed was 10 Å/sec. The film obtained was found to have an amorphous structure in which silicon, carbon and hydrogen were crosslinked, as determined by IR-absorption analysis and photoelectric spectroscopic analysis.

The recording diameter when writing was effected in the optical recording medium as obtained above at an oscillation wavelength of 830 nm and an input power into the medium of 7 mW was as shown in FIG. 11. The optical recording medium was adhered to a vinyl chloride resin with the sensitizing layer side as the inner side. As the adhesive layer, an urethane type adhesive (Hisole produced by Toray) was employed.

The recording diameter when writing was effected with laser onto the sealed structure type optical recording medium was as shown in FIG. 12. By sealing, although reduction of recording diameter occurs, even the case of practically sealed structure has a satisfactory relationship between recording diameter and recording speed.

COMPARATIVE EXAMPLE D-1

Figure 13:
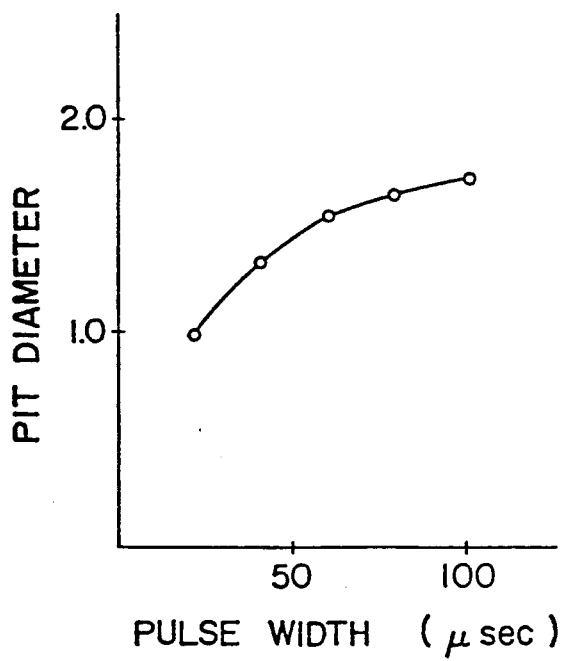

In the same manner as in Example D-1, a thin Te film with a thickness of 600 Å was provided on an acrylic resin support according to the sputtering method to provide a recording layer for an optical recording material. As different from Example D-1, without provision of a sensitizing layer, the Te layer was adhered to the vinyl chloride resin with the use of an urethane type adhesive to prepare an optical recording medium of the sealed structure. Writing was effected on the sealed structure optical recording medium similarly as in the case of Example D-1. The relationship of the writing hole diameter relative to the laser pulse time width was as shown in FIG. 13.

As compared with Example D-1, the difference is clear and it takes 10-fold or more of the laser pulse width in Comparative Example D-1. Thus, Comparative Example is unsuitable for writing as compared with Example.

EXAMPLE D-3

An optical recording medium obtained according to the same method as in Example D-1 (however, the dimensions of the optical recording portion were made 80 mm×20 mm) was punched into card dimensions to obtain an optical card having a thickness of 0.75 mm and an optical recording portion (80 mm×20 mm).

EXAMPLE E-1

A polycarbonate film (produced by Teijin K.K., Japan, trade name: Panlite, thickness: 400 μm) was prepared as a transparent sheet (support), and a composition for formation of surface protective layer comprising a silicone type UV-curable curing material (produced by Toray) was applied on one surface according to the spiral gravure reverse coating method to form a surface protective layer with a thickness of 2 μm.

On the other surface of the transparent sheet, a tracking forming layer with a guide groove for tracking, a recording layer and a sensitizing layer were successively formed as described below.

First, 5 parts by weight of a photosensitizer were added to 100 parts by weight of an oligoester acrylate (produced by Toa Gosei K.K., Japan, trade name M-5700), and the mixture was applied by the roll coating method at a ratio of 5 g/m$^2$, a matrix with the reverse shape of the guide groove for tracking was pushed against the coated surface and laminated by use of a roll. After cured by irradiation of UV-ray, the matrix was peeled off to form a tracking forming layer with a guide groove for tracking. As the matrix, a sheet having a tracking guide groove transferred with a UV-ray curable resin from a mold was employed.

Next, on the tracking forming layer, according to the sputtering method by use of tellurium simple substance as the sputtering target, a recording layer of 300 Å was formed. Sputtering was effected by use of a high frequency power source of 13.56 MHz under the conditions of an output of 100 W and an argon gas pressure of $1 \times 10^{-3}$ Torr.

Next, on the recording layer, a thin MgF$_2$ film was formed with a thickness of 500 Å according to the resistance heating vapor deposition to provide a sensitizing layer. The resistance heating vapor deposition was effected under the condition of $1 \times 10^{-5}$ Torr.

Separately, a polyvinyl chloride resin film (produced by Mitsubishi Jushi K.K., Japan, thickness 350 μm) was prepared, applied with printing of predetermined matters, then coated on the surface to be adhered of this film with a polyurethane type two-component adhesive (produced by Alps Kagaku K.K., Japan, trade name: Alpon) and laminated on the sensitizing layer side of the transparent sheet having the above respective layers formed thereon by use of a roll to obtain an optical recording medium.

COMPARATIVE EXAMPLE E-1

For comparison, an optical recording medium was obtained in the same manner as in Example E-1 except for omitting the sensitizing layer.

EXAMPLE E-2

According to the same method as in Example E-1 except for using a polycarbonate substrate (thickness 600 μm) having a tracking forming layer formed thereon according to the injection molding as the transparent sheet, an optical recording medium was prepared.

EXAMPLE E-3

According to the same method as in Example E-1 except for providing a recording layer of 350 Å according to the sputtering method by use of Te simple substance as the light reflective layer.

TEST EXAMPLE

For the optical recording media obtained in Example E-1 and Comparative Example E-1, writing was effected by use of a semiconductor laser of a wavelength of 830 mm and an output of 7 mW and evaluated.

Figure 14:
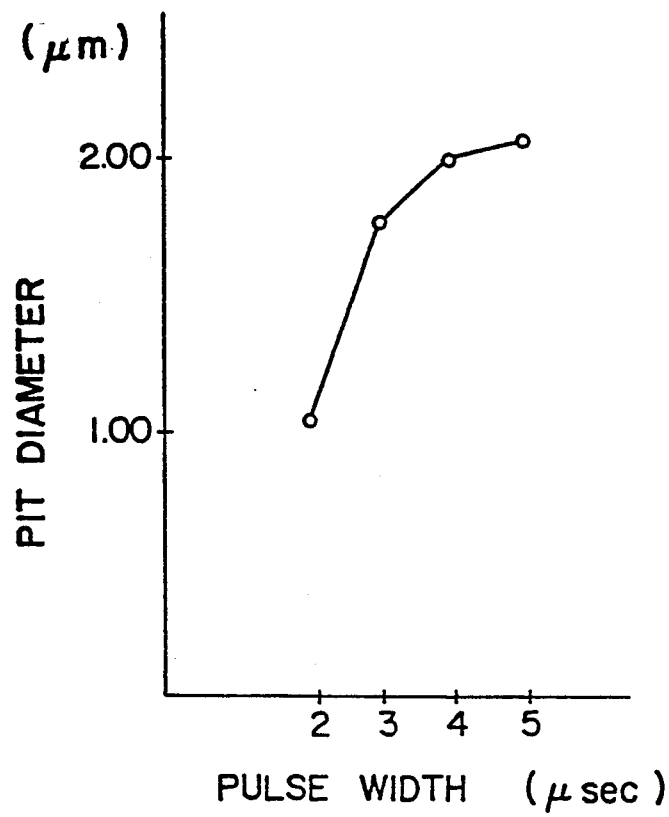

As the result, in the optical recording medium of Example E-1, as shown in FIG. 14, writing becomes possible from the vicinity of a pulse width of 24 μsec. However, in the optical recording medium of Comparative Example E-1, no writing of data was possible.

On the other hand, for the optical recording media of Examples E-2 and E-3, when writing was effected from the transparent sheet side with a semiconductor laser of a wavelength of 830 mm by use of a lens of $N_A$ 0.3, substantially the same results as in Example E-1 were obtained.

EXAMPLE E-4

An optical recording medium obtained according to the same method as in Example E-1 (however, the dimensions of the optical recording portion were made 80 mm×20 mm) was punched into card dimensions to obtain an optical card having a thickness of 0.75 mm and an optical recording portion (80 mm×20 mm).

EXAMPLE F-1

A polycarbonate film (produced by Teijin K.K., Japan, trade name: Panlite, thickness: 400 μm) was prepared as a transparent sheet, and a composition for formation of surface protective layer with a composition shown below was applied on one surface according to the spiral gravure reverse coating method to form a surface protective layer with a thickness of 2 μm.

COMPOSITION FOR FORMATION OF SURFACE PROTECTIVE LAYER: SILICONE TYPE UV-CURABLE SURFACE CURING AGENT (PRODUCED BY TORAY)

On the other surface of the transparent sheet, a tracking forming layer with a guide groove for tracking, a recording layer and a sensitizing layer were successively formed as described below.

First, 5 parts by weight of a photosensitizer were added to 100 parts by weight of an oligoester acrylate (produced by Toa Gosei K.K., Japan, trade name M-5700), and the mixture was applied by the roll coating method at a ratio of 5 g/m$^2$, a matrix with the reverse shape of the guide groove for tracking was pushed against the coated surface and laminated by use of a roll. After cured by irradiation of UV-ray, the matrix was peeled off to form a tracking forming layer with a guide groove for tracking. As the matrix, a sheet having a tracking guide groove transferred with a UV-ray curable resin from a mold was employed.

On the tracking forming layer, by use of tellurium/copper/lead=80/15/5 (weight ratio) as the sputtering target, a recording layer of 300 Å was formed. Sputtering was effected by use of a high frequency power source of 13.56 MHz under the conditions of an output of 100 W and an argon gas pressure of $1 \times 10^{-3}$ Torr.

Separately, a polyvinyl chloride resin film (produced by Mitsubishi Jushi K.K., thickness 350 μm) was prepared, applied with printing of predetermined matters, then coated on the surface to be adhered of this film with a hot melt type adhesive of which the base polymer is a vinyl resin (produced by Sekisui Kagaku K.K., Japan, trade name: Esdine 8900) with a thickness of 10μ to form an adhesive layer. With the surface of the adhesive layer of the polyvinyl chloride film being superposed on the surface of the recording layer of the transparent sheet having the above respective layers formed thereon, both were laminated by use of a roll to obtain an optical recording medium.

COMPARATIVE EXAMPLE F-1

For comparison, an optical recording medium was obtained in the same manner as in Example F-1 except for using a polyurethane type two-component adhesive (produced by Alps Kagaku, Japan, trade name: Alpon) as the adhesive.

Figure 15:
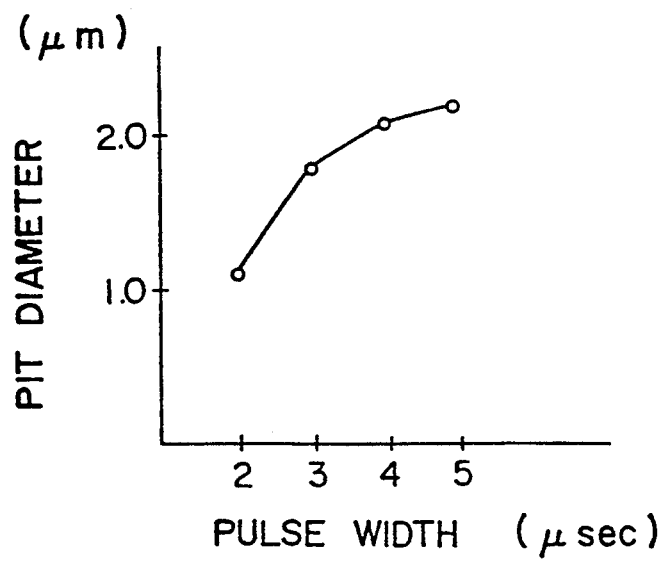

When writing was effected on the optical recording media obtained in Example F-1 and Comparative Example F-1 with a semiconductor laser of a wavelength of 830 nm and an output of 20 mW by varying the pulse width and evaluated, writing was possible in Example F-1 as shown in FIG. 15 from the condition of the pulse width of 2 μsec, but writing was impossible in the recording medium of Comparative Example F-1.

EXAMPLE F-2

An optical recording medium was obtained in the same manner as in Example F-1 except for forming a recording layer of 350 Å according to the sputtering method by use of Te simple substance. When writing was effected by use of the optical recording medium obtained under the same conditions as in Comparative Example F-1, writing was possible from the pulse width of 3 μsec.

EXAMPLE F-3

An optical recording medium was obtained in the same manner as in Example F-1 except for using a polycarbonate sheet formed by the injection molding method (thickness 600 μm) as the transparent sheet layer. When writing was effected on the optical recording medium by irradiation of a semiconductor laser of a wavelength of 830 nm from the transparent sheet side with the use of a lens of $N_A$ 0.3, writing could be done substantially similarly as in Example F-1.

EXAMPLE F-4 (PREPARATION EXAMPLE OF OPTICAL CARD)

A polycarbonate film (produced by Teijin K.K., Japan, trade name: Panlite, thickness: 400 μm) was prepared as a transparent sheet, and a composition for formation of surface protective layer with a composition shown below was applied on one surface according to the spiral gravure reverse coating method to form a surface protective layer with a thickness of 2 μm.

COMPOSITION FOR FORMATION OF SURFACE PROTECTIVE LAYER: SILICONE TYPE UV-CURABLE SURFACE CURING AGENT (PRODUCED BY TORAY)

On the other surface of the transparent sheet, a tracking forming layer with a guide groove for tracking, a recording layer and a sensitizing layer were successively formed as described below.

First, 5 parts by weight of a photosensitizer were added to 100 parts by weight of an oligoester acrylate (produced by Toa Gosei K.K., Japan, trade name M-5700), and the mixture was applied by the roll coating method at a ratio of 5 g/m² to the dimensions of 80 mm×20 mm, a matrix with the reverse shape of the guide groove for tracking was pushed against the coated surface and laminated by use of a roll. After cured by irradiation of UV-ray, the matrix was peeled off to form a tracking forming layer with a guide groove for tracking. As the matrix, a sheet having a tracking guide groove transferred with a UV-ray curable resin from a mold was employed.

Next, on the tracking forming layer, by use of tellurium/copper/lead=80/15/5 (weight ratio) as the sputtering target, a recording layer of 300 Å was formed. Sputtering was effected by use of a high frequency power source of 13.56 MHz under the conditions of an output of 100 W and an argon gas pressure of $1 \times 10^{-3}$ Torr.

Separately, a polyvinyl chloride resin film (produced by Mitsubishi Jushi K.K., Japan, thickness 350 μm) was prepared, applied with printing of predetermined matters, then coated on the surface to be adhered of this film with a hot melt type adhesive of which the base polymer is a polyester resin (produced by Diabond Kogyo K.K., Japan, trade name: Meltron E801) with a thickness of 10μ to form an adhesive layer. With the surface of the adhesive layer of the polyvinyl chloride film being superposed on the surface of the recording layer of the transparent sheet having the above respective layers formed thereon, both were laminated by use of a roll to obtain an optical recording medium. The optical recording medium obtained was punched into card dimensions to obtain an optical card having a thickness of 0.75 mm and an optical recording portion (80 mm×20 mm).

EXAMPLE G-1

By use of an acrylic plate (thickness 0.4 mm) provided with fine unevenness for tracking as the support, a recording layer ($TeO_x$) with a thickness of 500 Å was provided on the support surface according to the reactive sputtering method. As the target in this case, Te of 99.99% purity was employed.

The above reactive sputtering was conducted in an atmosphere of 85% of argon, 14% of oxygen and a pressure of $5 \times 10^{-3}$ Torr.

As the next step, subsequently a sensitizing layer ($TeO_x$) with a thickness of 500 Å was provided on the recording layer obtained above in an atmosphere of 58% of argon, 42% of oxygen and a pressure of $5 \times 10^{-3}$ Torr.

In the above respective layers, x=0.7, y=1.8.

For the optical recording medium obtained, information recording was performed.

High speed, high sensitivity recording of 1 μm or less could be done with a laser beam of 830 nm and 5 mW. The information pit formed had a good recorded shape, and there was no change observed in sensitivity and stability when left to stand for about one month in an atmosphere of 60° C. and a relative humidity of 90%.

On the surface of the sensitizing layer of the optical recording medium was further bonded and integrated a vinyl chloride substrate with a thickness of 0.32 mm through a two-liquid curable urethane type adhesive layer, followed by molding into a card size to obtain an optical record which is another embodiment of the optical recording medium.

When information recording was performed on this optical record, high speed, high sensitivity recording of 3 μs or less could be done with a laser beam of 830 nm and 5 mW. There was no change observed in sensitivity and stability, when left to stand for about 3 months in an atmosphere of 60° C. and a relative humidity of 90%.

COMPARATIVE TEST EXAMPLE

On a support thin films of Te simple substance, a weak oxide of Te ($TeO_{0.5}$) and a strong oxide of Te ($TeO_{1.8}$) were respectively formed, and recording sensitivity and weathering resistance (when left to stand at 40° C. in 90% relative humidity) were examined to obtain the following results.

| Recording layer | Sensitivity | Weathering resistance |
|---|---|---|
| Te | Good | Reflectance lowered within 100 hours |
| Te weak oxide | Good | No change after 500 hours or longer |
| Te strong oxide | Not good | the same as above |

As described above, the recording layers of Te and Te weak oxide exhibited good recording sensitivities. However, in weathering resistance test, Te thin film exhibited remarkable lowering in reflectance within about 100 hours, and thereafter the thin film became completely matte. On the other hand, the recording layer comprising the Te strong film had excellent weathering resistance, but no writing of information could be effected.

EXAMPLE G-2

On a support made of PMMA with a thickness of 0.6 mm, a recording layer and a sensitizing layer were formed by the method as described below.

A vacuum vapor deposition device having a hot electron collision type ion gun arranged therein was preliminarily evacuated to a vacuum degree of $10^{-5}$ Torr, and then the vacuum degree was maintained at $8 \times 10^{-5}$ Torr by introducing oxygen gas into the device.

Next, vacuum vapor deposition of Te and irradiation of ion beam onto the support were effected at the same time.

The film preparation conditions were as follows:
Ion gun:
  Acceleration voltage: 500 V
  Oxygen ion current density on substrate: 50 $\mu A/cm^2$
Film forming speed of Te: 10 Å/sec.
Film thickness: 500 Å

Next, by maintaining the vacuum degree in the device at $1.0 \times 10^{-4}$ Torr by introducing oxygen gas into the device, a sensitizing layer was further subsequently formed on the surface of the recording layer formed as described above. The film preparation conditions were as follows:

Ion gun:
  Acceleration voltage: 500 V
  Oxygen ion current density on substrate: 500 $\eta A/cm^2$
Film forming speed of Te: 10 Å/sec
Film thickness: 1000 Å

The compositions of the respective thin films obtained were $TeO_{0.5}$ for the recording layer and $TeO_{1.2}$ for the sensitizing layer.

For the optical recording medium of the present invention thus obtained, information recording sensitivity and stability were examined according to the same method as in the foregoing Example G-1, to obtain substantially the same results as in Example G-1.

EXAMPLE H-1

A subbing agent (produced by Shinetsu Kagaku Kogyo, Japan, Primer PC-4) was applied by gravure coating on a polycarbonate film with a thickness of 400 $\mu m$, then a silicone type surface curing agent (produced by Shinetsu Kagaku Kogyo, Japan, X-12-2150) by gravure coating threreon, followed by curing at 100° C. for one minute to obtain a surface cured layer. On the back surface of the above polycarbonate film, a coating solution for formation of a photosensitive material layer was provided partially by gravure coating. The amount of the coating solution for formation of photosensitive material coated was 3 $g/m^2$.

| Composition of coating solution for formation of photosensitive material: | |
|---|---|
| 10% methyl ethyl ketone solution of vinyl methyl ether/maleic anhydride ester copolymer resin (Gentretz AN139, produced by G.A.F. Corp.) | 20 wt. parts |
| 20% methyl ethyl ketone solution of polyvinyl acetate resin (Ethnyl C-2, produced by Sekisui Kagaku) | 20 wt. parts |
| 25% methylcellosolve solution of an acrylic resin (L-40, produced by Soken Kagaku) | 12 wt. parts |
| 0.1% methylcellosolve solution of palladium chloride ($PdCl_2$: conc. HCl: methylcellosolve = 1:10:1000) | 38 wt. parts |
| | 38 wt. parts |
| 10% methylcellosolve solution of 4-morpholino-2,5-dibutoxybenzene-diazoniumborofluoride (DH300 $BF_4$, produced by Daito Kagaku) | 10 wt. parts |

Next, on the surface of the photosensitive layer thus formed, the mask surface of a photomask subjected to negative patterning with an arrangement at a pitch of 20 $\mu m$ between the rows aligned with a pitch of 15 $\mu m$ of the dots of 15 $\mu m \times 5$ $\mu m$ was closely contacted, and exposure was effected from the photomask side by an ultra-high pressure mercury lamp (3 kW, distance 1 m) for 10 seconds.

This photomask pattern used in this case was obtained by the photoetching method. It was prepared by coating and drying a photoresist (AZ-1350, produced by Sipley) on a thin Cr thin film formed according to the sputtering method on a glass plate, then effecting irradiation of He-CD laser according to the above arrangement with a narrowed beam diameter of 2 $\mu m$ on the X-Y stage on the dried surface controlled in position, treating the exposed pattern with a resist developer (produced by Sipley) at 130° C. for 25 minutes, followed by etching with a ferric chloride solution to make the dot portions transmissive.

Subsequently, the photosensitive material layer subjected to pattern exposure as described above was successively dipped in the treating solutions [A], [B] having the following compositions in this order for 60 seconds, and 80 seconds (treatment temperature 30° C.).

| [A] Siba nickel (produced by Okuno Seiyaku, Japan) | |
|---|---|
| Boron type reducing agent | 0.5 g |
| Nickel sulfate | 3.0 g |
| Sodium citrate | 1.0 g |
| Water | 95.5 g |
| [B] 1:1 mixture of TMP chemical nickel-A and TMP chemical nickel-B | |
| Nickel sulfate | 9.0 g |
| Sodium hypophosphite | 7.0 g |
| Aqueous $NH_3$ solution (28%) | 6.5 g |
| Sodium citrate | 10.0 g |
| Water | 67.5 g |

After dipping, the layer was washed with water and dried to obtain a first recording layer having a positive pattern comprising a black light intercepting portion in the light transmissive portion.

On the first recording layer subjected to patterning as described above, a Te-Cu-Pb alloy (sputtering target composition ratio of 80:15:5 in terms of molar ratio) was sputtered to form a second recording layer, thus obtaining an optical recording material. In this case, the second layer of the thin Te-Cu-Pb film was formed only on the portion where there was the first recording layer, and not on the peripheral marginal portion.

Separately from the above optical recording materials, first a transfer film having an acrylic resin (produced by Toyo Morton, Japan, Adcoat AD33B4) coated and dried onto a polyester film with a thickness of 25 μm was prepared. Next, with the coated surface of the transfer film being closely contacted with the second recording layer surface of the above optical recording material, the composite was passed through the heat rolls with a surface temperature of 100° C. at a speed of 1 cm/sec, and after the polyester film was peeled off to form a sensitizing layer by transferring only the above acrylic resin onto the second recording layer of the above optical recording material.

On the other hand, the card substrate was prepared as described below. First, on both the surfaces of a white rigid polyvinyl chloride resin sheet (thickness: 200 μm), a pattern of letters and figure was provided by screen printing, and further separately from this, a magnetic recording layer was provided with a width of 6.5 mm on a part of one surface of a transparent rigid polyvinyl chloride (thickness: 100 μm), and with the above printed white rigid polyvinyl chloride resin sheet superposed on the surface on the side where no magnetic recording layer is provided, to be sandwiched between the two sheets of stainless steel plates, both were fused together by a pressing machine by heating under pressurization at 140° C. for 30 minutes to obtain a card substrate.

The optical recording material on the card substrate prepared as described above were superposed on the second recording layer of the optical recording material and the white rigid polyvinyl chloride resin sheet surface of the card substrate through an urethane type resin adhesive (produced by Alps Kagaku Sangyo, Japan, Arbon EU-4200: EHU-4200=10:1, weight ratio), and pressure adhered by use of rolls, and left to stand for 24 hours and punched out into the predetermined dimensions by means of a punching mold to obtain an optical card.

EXAMPLE H-2

Similarly as described in Example H-1, iron-phthalocyanine which is a dye was provided on the surface of the second recording layer as the sensitizing layer to obtain an optical card.

EXAMPLE H-3

Similarly as described in Example H-1, an optical recording material was obtained, and a coating solution having 5 parts by weight of carbon black mixed and dispersed in 100 parts by weight of an acrylic resin (Dianal LR 1215, produced by Mitsubishi Rayon K.K., Japan) was provided as the sensitizing layer on the second recording layer of the above optical recording material to obtain an optical card.

EXAMPLE I-1

On a polycarbonate film with a thickness of 400 μm, a subbing treating agent (Primer PC-4, produced by Shinetsu Kagaku Kogyo K.K., Japan) was gravure coated, and then a silicon type surface curing agent (X-12-2150, produced by Shinetsu Kagaku Kogyo) was gravure coated thereon, followed by curing at 100° C. for 1 minute to obtain a surface cured layer. On the back surface of the above polycarbonate film, a coating solution for formation of a light-sensitive layer with a composition shown below was partially provided by gravure coating. The amount of the coating solution for formation of light-sensitive material was 3 g/m³ on drying.

| Composition of coating solution for formation of light-sensitive material | |
| --- | --- |
| Vinyl methyl ether/maleic anhydride ester copolymer resin (produced by G.A.F. Corp., Gantrez AN139) 10% methyl ethyl ketone solution | 20 wt. parts |
| Polyvinyl acetate resin (produced by Sekisui Kagaku K.K., Japan, Ethneel C-2) 20% methyl ethyl ketone solution | 20 wt. parts |
| Acrylic resin (produced by Soken Kagaku, Japan, L-40) 25% methyl cellosolve solution | 12 wt. parts |
| Palladium chloride 0.1% methyl cellosolve solution $PdCl_2$: conc. hydrochloric acid: methyl cellosolve = 1:10:1000) | 38 wt. parts |
| 4-morpholino-2,5-dibutoxybenzenediazonium borofluoride (produced by Daito Kagaku, Japan, DH300 $BF_4$) 10% methyl cellosolve solution | 10 wt. parts |

Next, on the surface of the light-sensitive material layer thus formed, the mask surface of a photomask subjected to negative patterning with an arrangement of the rows of the dots of 15 μm×5 μm aligned at a pitch of 15 μm with a pitch between the rows of 20 μm was closely contacted, and exposed from the photomask side via ultra-high pressure mercury lamp (3 kW, distance: 1 m) for 10 seconds.

The photomask pattern used in this case was obtained by the photoetching method, and prepared by coating a photoresist (produced by Sipley AZ-1350) on the Cr thin film formed by the sputtering method on a glass plate, followed by drying, and narrowing He-Cd laser to a beam diameter of 2 μm on the X-Y stage controlled in position on that surface, effecting patterning according to the above arrangement, treating the resist with a resist developer (produced by Sipley), heat treating the developed resist at 130° C. for 25 minutes, followed by etching with a ferric chloride solution to make the dot portion transmissive.

Subsequently, the light-sensitive material layer subjected to pattern exposure as described above was dipped in the processing solutions [A], [B] having the following compositions in this order to be dipped therein for 60 seconds and 80 seconds, respectively. (processing temperature 30° C.)

| [A] Siba nickel (produced by Okuno Seiyaku, Japan) | |
| --- | --- |
| Boron type reducing agent | 0.5 g |
| Nickel sulfate | 3.0 g |
| Sodium citrate | 1.0 g |
| Water | 95.5 g |
| [B] 1:1 mixture of TMP chemical nickel-A and TMP chemical nickel-B | |
| Nickel sulfate | 9.0 g |
| Sodium hypophosphite | 7.0 g |
| Aqueous $NH_3$ solution (28%) | 6.5 g |
| Sodium citrate | 10.0 g |
| Water | 67.5 g |

After dipping, water washing and drying were performed to obtain a first recording layer having a positive pattern comprising a black light-intercepting portion in the light-transmitting portion was obtained.

On the first recording layer subjected to patterning as described above, a second recording layer was formed by sputtering of a Te-Cu-Pb alloy (sputtering target composition ratio was 80:15:5 in terms of molar ratio) to obtain an optical recording material. In this case, the second recording layer of the Te-Cu-Po thin film was formed only on the portion where the first recording layer existed, and not formed at the peripheral portion.

Separately from the above optical recording material, first, a transfer film having an acrylic resin (produced by Toyo Morton, Adcoat AD33B4) coated and dried on a polyester film with a thickness of 25 μm was prepared. Next, with the coated surface of the transfer film being closely contacted on the second recording layer surface of the above optical recording material, the composite was passed through the heat rolls of 100° C. at a speed of 1 cm/sec and thereafter the polyester film was peeled off, and only the above acrylic resin was transferred onto the surface of the second recording layer of the above optical recording material to form a sensitizing layer.

EXAMPLE I-2

An optical recording material was obtained similarly as in Example I-1, and an iron-phthalocyanine which is a dye was provided as the sensitizing layer on the surface of the second recording layer to obtain an optical recording material.

EXAMPLE I-3

Similarly as described in Example I-1, an optical recording material was obtained and a coating solution having 5 parts by weight of carbon black mixed and dispersed in 100 parts by weight of an acrylic resin (Dianal LR 1215, produced by Mitsubishi Rayon) provided as the sensitizing layer on the surface of the second recording layer of the above optical recording material to obtain an optical recording material.

UTILIZABILITY IN INDUSTRY

The DRAW type optical recording material of the present invention can be applied for articles with various forms and shapes such as flexible disc, card, tape, sheet, etc , and can be applied widely for such uses as mentioned below.

(1) Monetary circulation industry cash card, credit card, prepaid card.
(2) Medical health industry: health certificate, karte, medical card, emergency card.
(3) Leisure industry: software medium, member card, entree ticket, medium for controlling play machine, medium for TV game, medium for orchestral accompaniment.
(4) Transporting travel industry traveler's card, certificate, pass, passport.
(5) Publication industry: electronic publication.
(6) Information processing industry external memory medium for electronic machine, filing.
(7) Education industry: teaching material program, result management card, entrance and exit management and book management of library.
(8) Automobile industry: medium for maintenance recording, maintenance of running.
(9) Fa: program recording medium for MC, NC, robbot, etc.
(10) Others building control, home control, ID card, medium for automatic vending machine, cooking card, etc.

We claim:

1. A DRAW type optical recording card comprising:
   a surface protective layer;
   a transparent first support formed on the surface protective layer;
   a tracking forming layer, having at least one guide groove for tracking, formed on the transparent first support;
   a recording layer provided on said tracking forming layer for forming information pits through physical deformation thereof by irradiation of an energy beam;
   means for augmenting thermochemically the physical deformation in said recording layer, said means comprising a hot melt adhesive sensitizing layer provided on the recording layer; and
   a second support provided on said sensitizing layer;
   wherein said recording layer and said sensitizing layer are laminated between said first and second supports and no voids exist between the layers, and said recording layer and said sensitizing layer are sealed from an outer environment.

2. A DRAW type optical recording medium according to claim 1, wherein said recording layer comprises a light reflective thin metal film.

3. A DRAW type optical recording medium according to claim 1, wherein said recording layer comprises tellurium.

4. A DRAW type optical recording medium according to claim 1, wherein said sensitizing layer further contains a light absorber.

5. A DRAW type optical recording medium according to claim 1, wherein said recording layer comprises a laminated product of a first recording layer comprising a light transmitting portion and a light intercepting portion and a second recording layer comprising a light reflective thin metal film.

6. A DRAW type optical recording medium according to claim 1, wherein said recording layer comprises an oxide of tellurium represented by the formula $TeO_x$, wherein x is a positive real number.

* * * * *